US012645415B2

(12) United States Patent      (10) Patent No.:    US 12,645,415 B2

Kim et al.          (45) Date of Patent:       Jun. 2, 2026

---

(54) ELECTRONIC DEVICE, AND SCREEN DISPLAY METHOD ACCORDING TO CHANGE OF FOLDING STATE USING SAME

(71) Applicant: Samsung Electronics Co., Ltd., Suwon-si (KR)

(72) Inventors: Jinik Kim, Suwon-si (KR); Namjoon Park, Suwon-si (KR); Seoyoung Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/039,456

(22) Filed: Jan. 28, 2025

(65) Prior Publication Data

US 2025/0173108 A1     May 29, 2025

Related U.S. Application Data

(63) Continuation of application No. PCT/KR2023/008132, filed on Jun. 13, 2023.

(30) Foreign Application Priority Data

Aug. 9, 2022    (KR) ........................ 10-2022-0099495
Oct. 18, 2022    (KR) ........................ 10-2022-0133766

(51) Int. Cl.
    *G06F 3/14*         (2006.01)
    *G01B 7/30*         (2006.01)
            (Continued)

(52) U.S. Cl.
    CPC ............. *G06F 3/1423* (2013.01); *G01B 7/30* (2013.01); *G06F 1/1616* (2013.01); *G06F 3/048* (2013.01)

(58) Field of Classification Search
    CPC ...... G06F 3/1423; G06F 3/048; G06F 1/1616; G01B 7/30
            (Continued)

(56) References Cited

U.S. PATENT DOCUMENTS 8,854,332 B1    10/2014   Cho et al.
10,168,821 B2    1/2019   Chi et al.
          (Continued)

FOREIGN PATENT DOCUMENTS

CN      110545354 A    12/2019
CN      113703519 A    11/2021
          (Continued)

OTHER PUBLICATIONS

International Search Report for PCT/KR2023/008132 mailed Sep. 18, 2023, 6 pages with English translation.
(Continued)

*Primary Examiner* — Kwin Xie
(74) *Attorney, Agent, or Firm* — Nixon & Vanderhye, P.C.

(57)           ABSTRACT

An electronic device comprises: a first housing connected to a hinge module comprising a hinge; a second housing connected to the hinge module and configured to be foldable with respect to the first housing; a first display; a second display; a first inertial sensor arranged in the first housing; a second inertial sensor arranged in the second housing; a memory; and at least one processor, comprising processing circuitry, wherein at least one processor, individually and/or collectively, may be configured to: determine, based on detecting the electronic device being switched from a folded state to an unfolded state, a posture of the electronic device based on first sensing information of the first inertial sensor, second sensing information of the second inertial sensor, and time information during which an angle between the first (Continued)

housing and the second housing is changed to a designated angle; and set a direction of a screen into a display mode corresponding to the determined posture of the electronic device and display the screen on the first display.

20 Claims, 24 Drawing Sheets

(51) Int. Cl.
  *G06F 1/16* (2006.01)
  *G06F 3/048* (2013.01)
(58) Field of Classification Search
  USPC .......................................................... 345/1.3
  See application file for complete search history.

(56) References Cited

U.S. PATENT DOCUMENTS

| | | | |
|---|---|---|---|
| 11,616,869 B2 | 3/2023 | Lee et al. | |
| 12,014,104 B2 | 6/2024 | Jin et al. | |
| 2010/0085274 A1* | 4/2010 | Kilpatrick ............. | G06F 1/1641 |
| | | | 345/1.3 |
| 2017/0068277 A1* | 3/2017 | Cohen ....................... | G06F 3/03 |

| | | | |
|---|---|---|---|
| 2020/0125144 A1 | 4/2020 | Chung et al. | |
| 2020/0320962 A1* | 10/2020 | Kim .......................... | G09G 5/38 |
| 2020/0340794 A1 | 10/2020 | Park | |
| 2021/0099570 A1* | 4/2021 | Schenone ............. | G06F 1/1615 |
| 2022/0163999 A1* | 5/2022 | Perelli ................... | G06F 1/1641 |
| 2023/0108323 A1* | 4/2023 | Yu .......................... | G06F 1/1694 |
| | | | 361/679.27 |
| 2023/0152862 A1 | 5/2023 | Choi et al. | |

FOREIGN PATENT DOCUMENTS

| | | | | |
|---|---|---|---|---|
| EP | 2622494 B1 * | 3/2017 | .......... | G06F 3/0481 |
| KR | 20200045660 A | 5/2020 | | |
| KR | 102131825 B1 | 7/2020 | | |
| KR | 20220017078 A | 2/2022 | | |
| KR | 20220017203 A | 2/2022 | | |
| KR | 20220035754 A | 3/2022 | | |
| KR | 20220039085 A | 3/2022 | | |
| KR | 20220083093 A | 6/2022 | | |
| KR | 102516485 B1 * | 4/2023 | .......... | H04B 17/102 |

OTHER PUBLICATIONS

Written Opinion of the ISA for PCT/KR2023/008132 mailed Sep. 18, 2023, 6 pages.

* cited by examiner

START

OBTAIN INFORMATION RELATED TO CONTACT WITH HINGE
MODULE THROUGH GRIP SENSORS DISPOSED ON AT LEAST PORTION
OF HINGE MODULE IN FOLDED STATE OF ELECTRONIC DEVICE ～1510

DETERMINE POSTURE OF ELECTRONIC DEVICE ON
BASIS OF INFORMATION RELATED TO CONTACT WITH
HINGE MODULE OBTAINED THROUGH GRIP SENSOR ～1520

END

ELECTRONIC DEVICE, AND SCREEN DISPLAY METHOD ACCORDING TO CHANGE OF FOLDING STATE USING SAME

CROSS-REFERENCE TO RELATED APPLICATIONS

This application is a continuation of International Application No. PCT/KR2023/008132 designating the United States, filed on Jun. 13, 2023, in the Korean Intellectual Property Receiving Office and claiming priority to Korean Patent Application Nos. 10-2022-0099495, filed on Aug. 9, 2022, and 10-2022-0133766, filed on Oct. 18, 2022, in the Korean Intellectual Property Office, the disclosures of each of which are incorporated by reference herein in their entireties.

BACKGROUND

Field

The disclosure relates to an electronic device and a method of displaying a screen according to a change of a folding state using the same.

Description of Related Art

Recently, in order to enhance portability, displays that go beyond flexible forms and can be fully folded (foldable) are being developed. Such foldable displays can transition between a folded state (e.g., fully folded), an unfolded state (e.g., fully unfolded), and a state partially unfolded at a certain angle due to folding. An electronic device provided with a foldable display may include a hinge structure, a first housing structure connected to the hinge structure, and a second housing structure. In the unfolded state, a main display, at least partially foldable, may be formed on the front surface of the electronic device. In addition, the electronic device equipped with a foldable display may include a sub-display that operates independently from the main display. In the unfolded state, the sub-display may be visible through the rear surface of the electronic device. The electronic device may use a large-area main display in the unfolded state and the sub-display in the folded state.

An electronic device may be switched from a folded state in a landscape or portrait mode to an unfolded state in the landscape and/or portrait mode. When a screen is displayed in the switched landscape and/or portrait mode of the unfolded state, there may be an occurrence of phenomenon where a direction of the screen viewed by a user does not align with the screen displayed on a main display.

SUMMARY

Embodiments of the disclosure may provide an electronic device that may determine a posture of the electronic device based on sensing information obtained from an inertial sensor disposed in a first housing and a second housing in a folded state, and time information during which an angle between the first and second housings is changed to a designated angle, and then set a direction of a screen into a display mode corresponding to the determined posture and display the screen on a main display.

An electronic device, according to an example embodiment of the present disclosure, may include: a hinge module including a hinge; a first housing connected to the hinge module and including a first surface, a second surface facing in a direction opposite to the first surface, and a first side surface surrounding a first space between the first surface and the second surface; a second housing connected to the hinge module and configured to be foldable with respect to the first housing and including, in an unfolded state, a third surface facing in the same direction as the first surface, a fourth surface facing in a direction opposite to the third surface, and a second side surface surrounding a second space between the third surface and the fourth surface; a first display disposed as visible via at least a portion of the third surface from at least a portion of the first surface of the first housing; a second display disposed as visible via at least a portion of the fourth surface of the second housing; a first inertial sensor disposed in the first housing; a second inertial sensor disposed in the second housing; a memory; at least one processor, comprising processing circuitry, operatively connected to the first display, the second display, the first inertial sensor, the second inertial sensor, and the memory wherein at least one processor, individually and/or collectively, is configured to: based on detecting a switch of the electronic device from a folded state to an unfolded state, determine a posture of the electronic device based on first sensing information on the first inertial sensor, second sensing information on the second inertial sensor, and time information during which an angle between the first housing and the second housing is changed to a designated angle; and set a direction of the screen into a display mode corresponding to the determined posture of the electronic device to display the screen on the first display.

A method of displaying a screen according to a change in a folding state of an electronic device, according to an example embodiment of the present disclosure, may include: based on detecting a switch of the electronic device from a folded state to an unfolded state, determining a posture of the electronic device based on first sensing information on a first inertial sensor, second sensing information on a second inertial sensor, and time information during which an angle between the first housing and the second housing is changed to a designated angle; and setting a direction of the screen into a display mode corresponding to the determined posture of the electronic device and displaying the screen on the first display.

According to an example embodiment of the present disclosure, a non-transitory computer-readable storage medium (or computer program product) storing one or more programs may be provided. One or more programs according to an embodiment may, when executed by at least one processor of an electronic device, individually and/or collectively, cause the electronic device to: based on detecting a switch of the electronic device from a folded state to an unfolded state, determine a posture of the electronic device based on first sensing information on the first inertial sensor, second sensing information on the second inertial sensor, and time information during which an angle between the first housing and the second housing is changed to a designated angle; and set a direction of the screen into a display mode corresponding to the determined posture of the electronic device and displaying the screen on the first display.

An electronic device according to various example embodiments of the present disclosure may determine a posture of the electronic device based on sensing information obtained through inertial sensors disposed in each of a first housing and a second housing and time information during which an angle between the first housing and the second housing is changed to a designated angle, and switched from a folded state of a landscape mode or a portrait mode to an unfolded state of a landscape mode or a portrait mode, thereby enabling a direction of a screen displayed on a main display to be the same as a direction of a screen viewed by a user when the screen is displayed on the display. Therefore, when the electronic device is switched from a folded state in a landscape mode or a portrait mode to an unfolded state, it is possible to prevent/reduce incorrect recognition of the direction of the screen displayed through the main display, as well as to provide the user with convenience in using the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

FIG. 12A includes graphs indicating sensor values of a first inertial sensor and a second inertial sensor measured on a specific axis when a folding state of an electronic device being switched in a portrait mode (e.g., from a folded state to an unfolded state or from an unfolded state to a folded state) is detected, according to various embodiments;

DETAILED DESCRIPTION

Figure 2A:
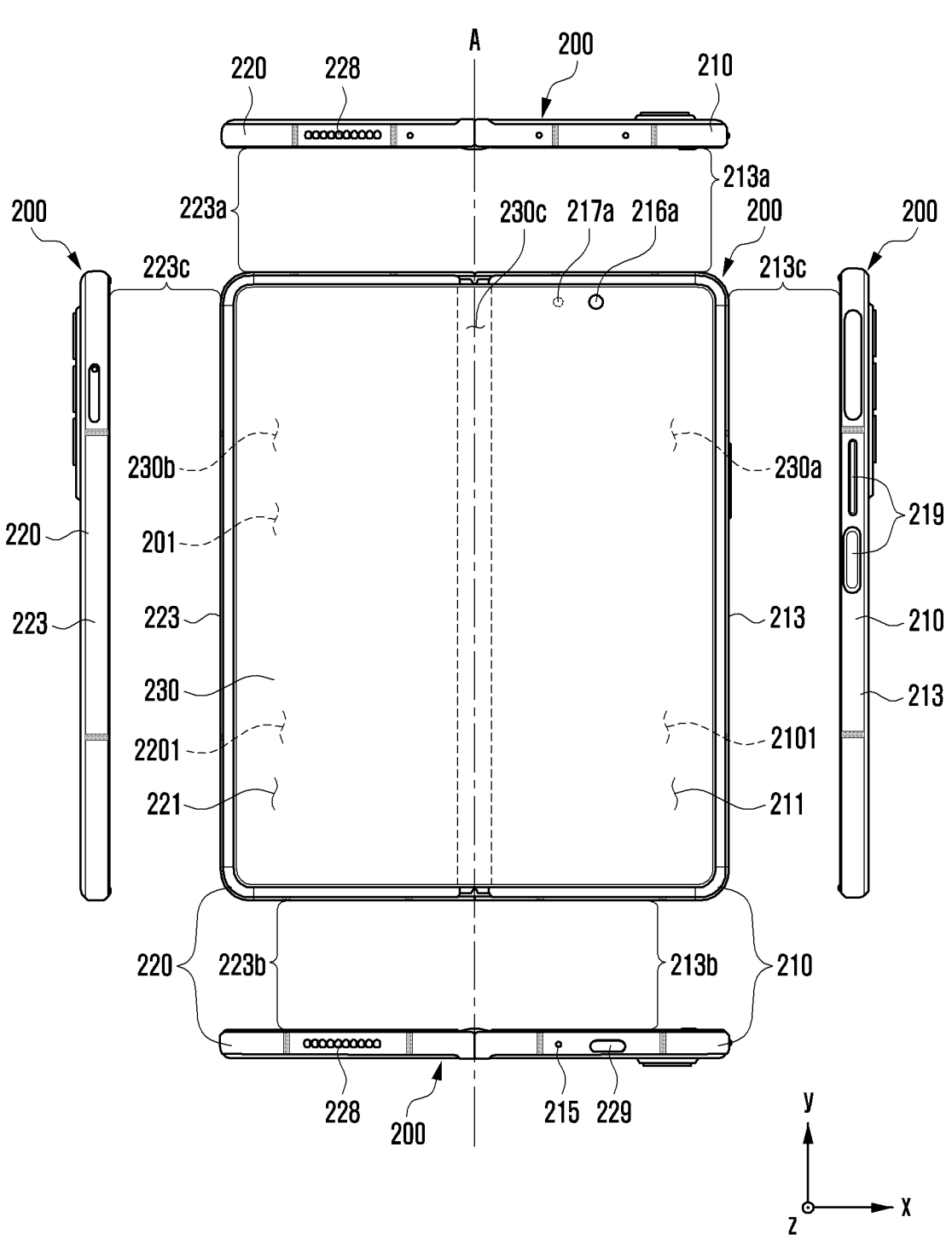
FIGS. 2A and 2B are diagrams illustrating an unfolded state of an electronic device (e.g., a foldable electronic device), viewed from the front and rear according to various embodiment.

Hereinafter, various example embodiments of the present disclosure will be described in greater detail with reference to the accompanying drawings. However, the present disclosure may be implemented in various different ways and is not limited to the various embodiments described herein. In connection with the description of the drawings, the similar or same reference numerals may be used for the similar or same elements. In addition, in the drawings and related descriptions, the description of well-known features and configurations may be omitted for clarity and conciseness.

Figure 1:
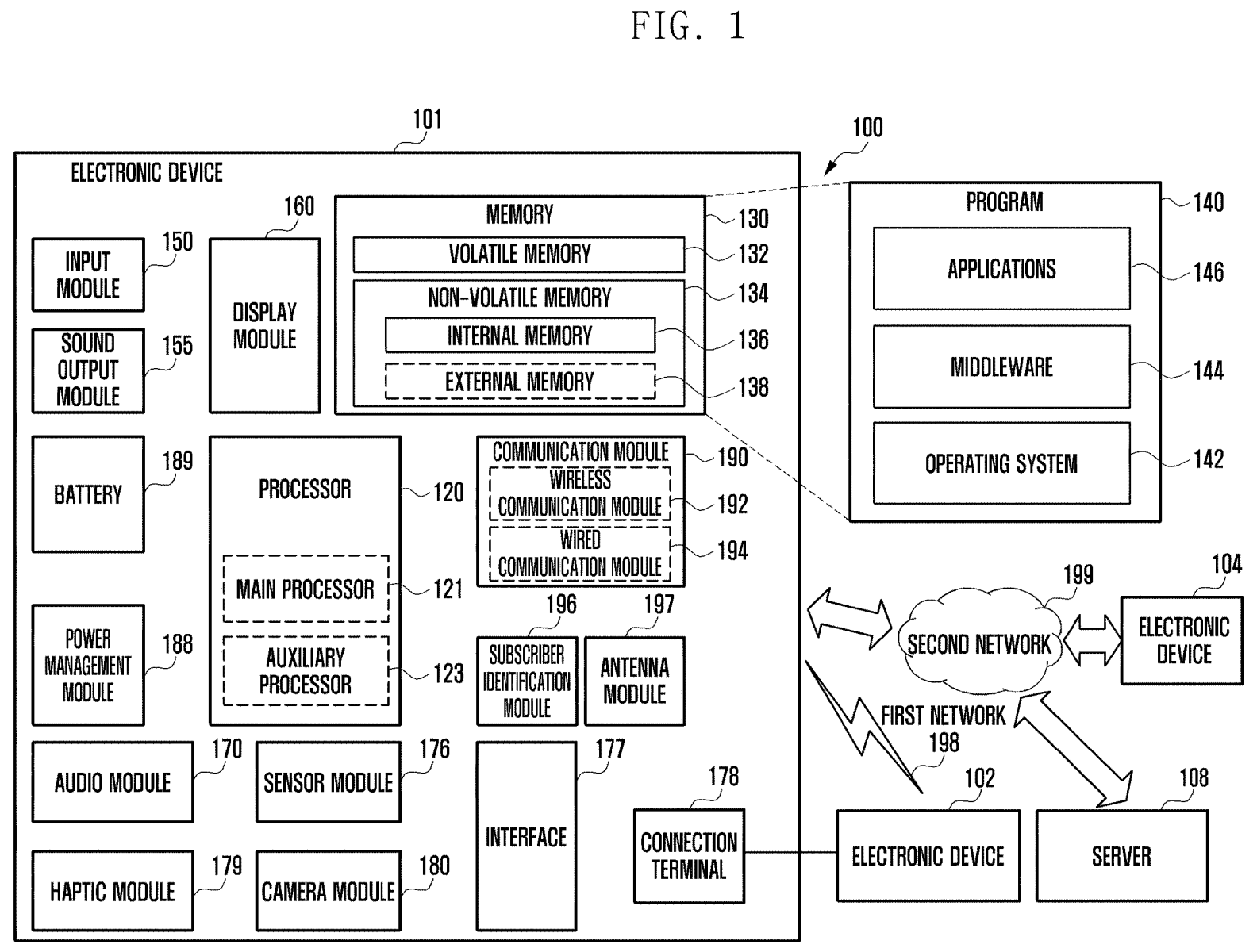

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server

108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls.

According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2B:
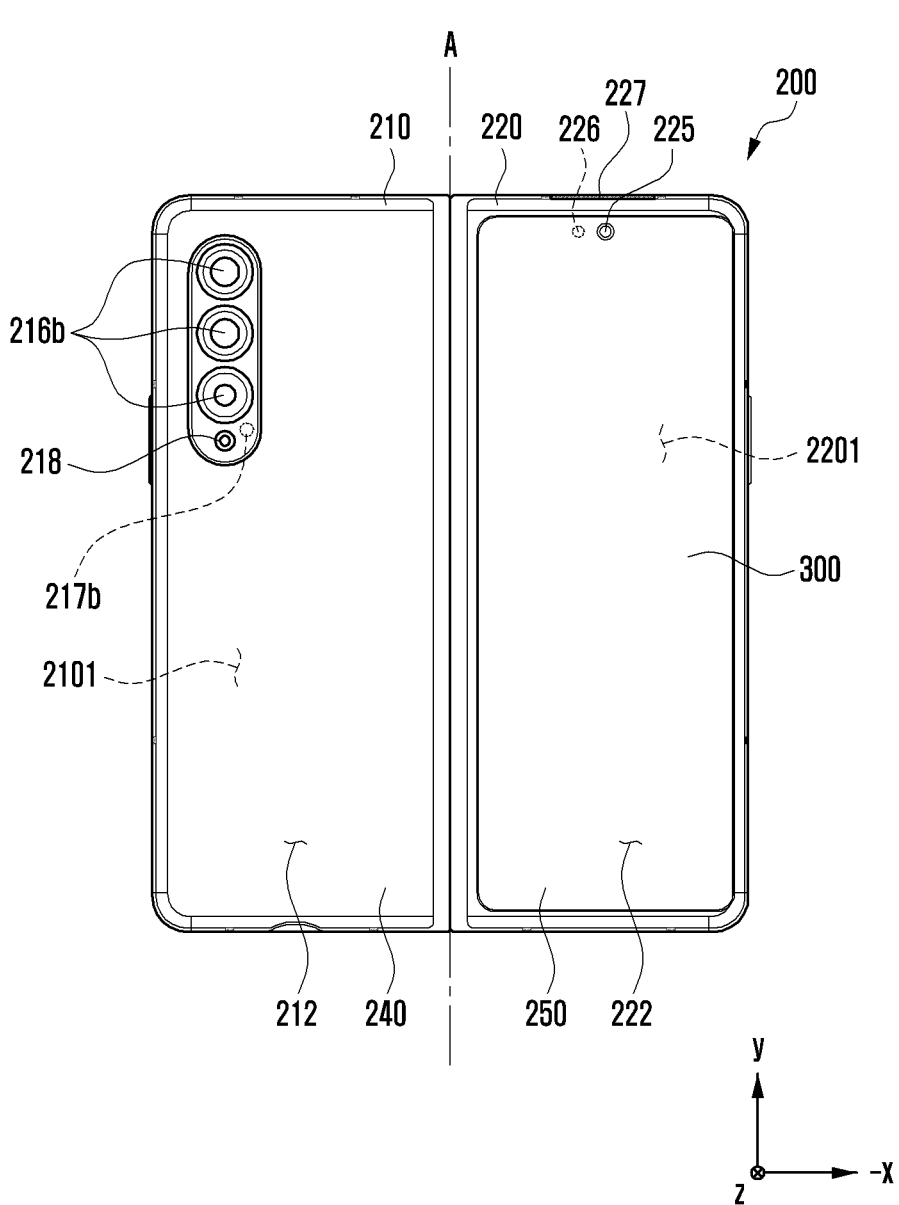
Figure 3A:
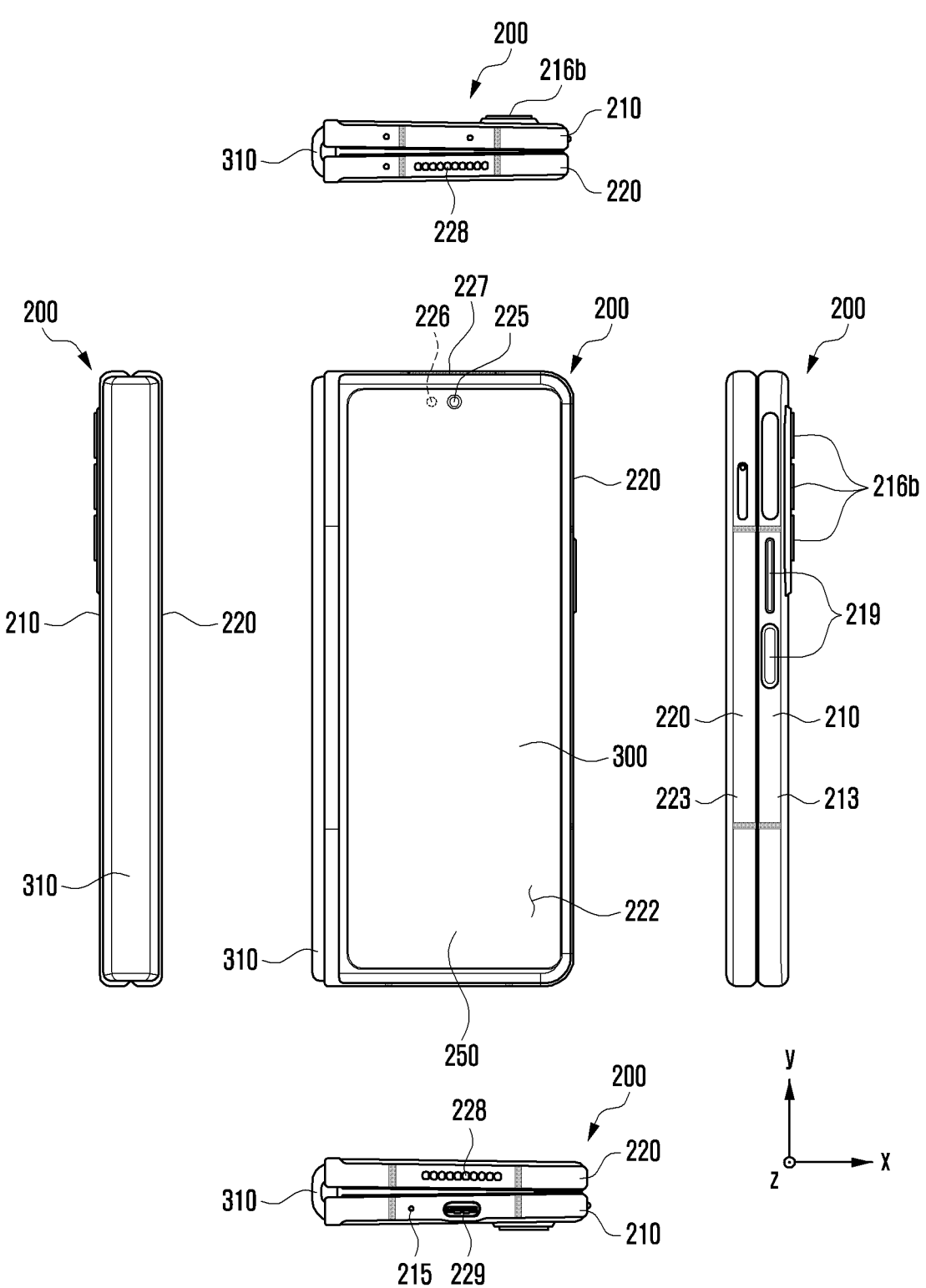
FIGS. 3A and 3B are diagrams illustrating a folded state of an electronic device, viewed from the front and rear according to various embodiments.
Figure 3B:
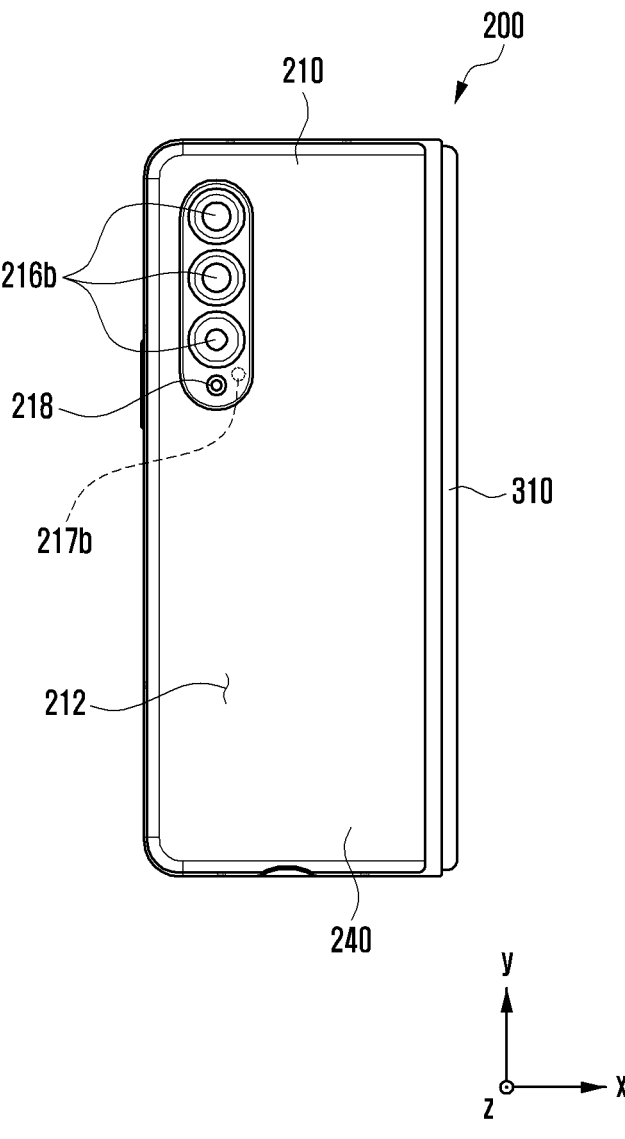

FIGS. 2A and 2B are diagrams illustrating front and rear views of an unfolding state of an electronic device (e.g., a foldable electronic device) according to various embodiments. FIGS. 3A and 3B are diagrams illustrating front and rear views of a folding state of an electronic device according to various embodiments.

According to various embodiments, the embodiments disclosed in FIG. 1 may be included in the embodiments disclosed in FIGS. 2A, 2B, 3A and 3B (which may be referred to as FIGS. 2A to 3B). For example, the electronic device 200 illustrated in FIGS. 2A to 3B may include the processor 120, the memory 130, the input module 150, the sound output module 155, the display module 160, the audio module 170, the sensor module 176, the interface 177, the connection terminal 178, the haptic module 179, the camera module 180, the antenna module 197, and/or the subscriber identification module 196, which are illustrated in FIG. 1. The electronic device shown in FIGS. 2A to 3B may include the foldable electronic device 200.

With reference to FIGS. 2A to 3B, the electronic device 200 (e.g., the foldable electronic device) according to various embodiments of the disclosure may include a pair of housings 210 and 220 (e.g., a foldable housing structure) rotatably coupled with respect to a folding axis A through a hinge device (e.g., a hinge plate 320 in FIG. 4) (e.g., a hinge module) so as to be foldable with respect to each other, a flexible display 230 (e.g., a first display, a foldable display, or a main display) disposed through the pair of housings 210 and 220, and/or a sub-display 300 (e.g., a second display) disposed through the second housing 220.

According to various embodiments, the hinge device (e.g., the hinge plate 320 in FIG. 4) may be disposed at least in part to be invisible from the outside through the first housing 210 and the second housing 220, and in the unfolding state, to be invisible from the outside through a hinge cover 310 (e.g., a hinge housing) that covers a foldable portion. In the disclosure, a surface on which the flexible display 230 is disposed may be defined as the front surface of the electronic device 200, and a surface opposite to the front surface may be defined as the rear surface of the electronic device 200. A surface surrounding a space between the front surface and the rear surface may be defined as a side surface of the electronic device 200.

Figure 4:
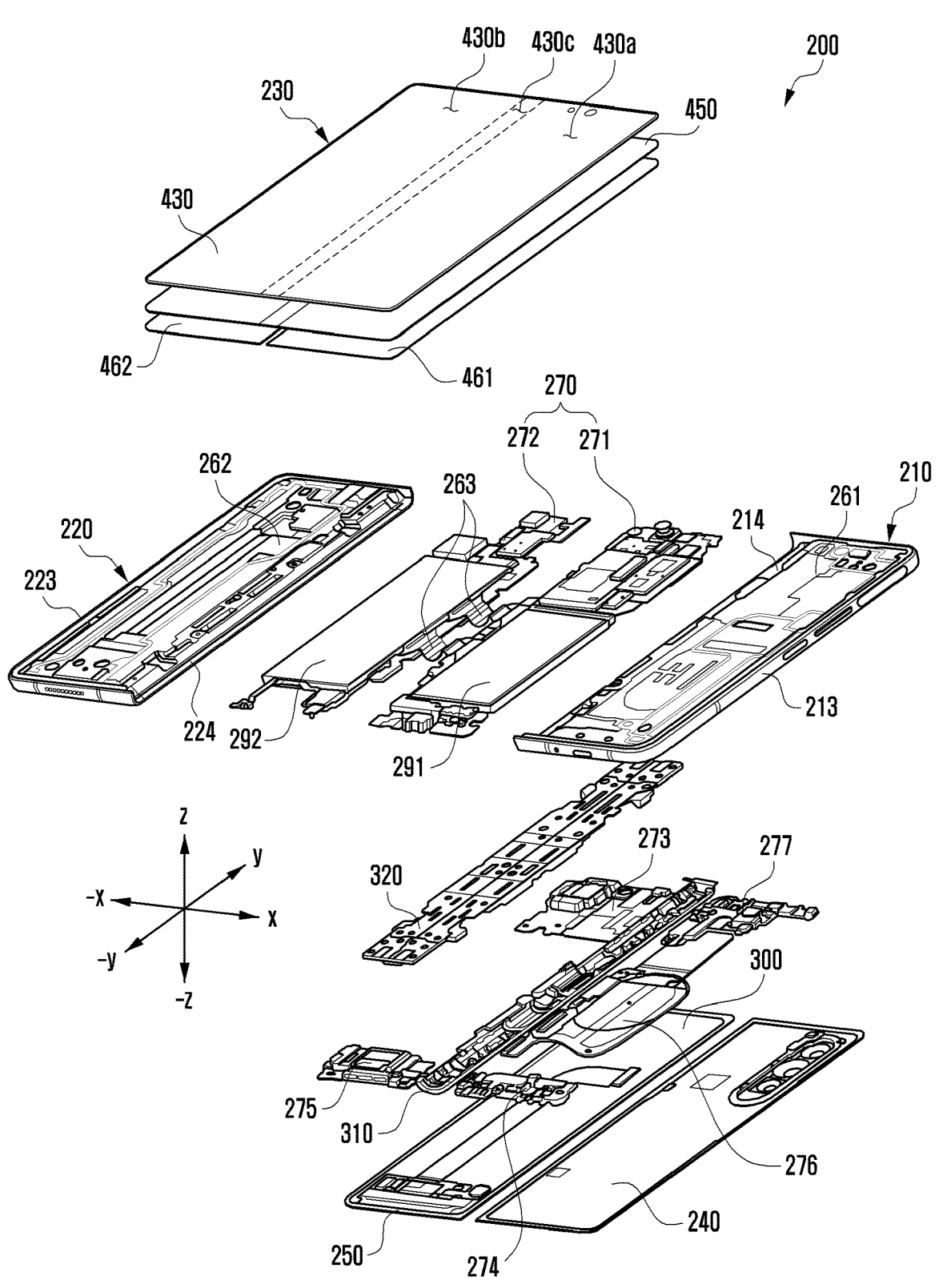
FIG. 4 is an exploded perspective view illustrating an electronic device, according to various embodiments.

According to various embodiments, the pair of housings 210 and 220 may include a first housing 210 and a second housing 220, which are foldably disposed with respect to each other through the hinge device (e.g., the hinge plate 320 in FIG. 4). Without being limited to the shape and combination shown in FIGS. 2A to 3B, the pair of housings 210 and 220 may be implemented with any other shape and/or any other combination of components. The first and second housings 210 and 220 may be disposed on both sides with respect to the folding axis A and may have an overall symmetrical shape with respect to the folding axis A. According to various embodiments, the first and second housings 210 and 220 may be folded asymmetrically with respect to the folding axis A. Depending on whether the electronic device 200 is in the unfolding state, the folding state, or an intermediate state, the first and second housings 210 and 220 may have different angles or distances therebetween.

According to various embodiments, the first housing 210 is connected to the hinge device (e.g., the hinge plate 320 in FIG. 4) in the unfolding state of the electronic device 200, and may have a first surface 211 disposed to face the front of the electronic device 200, a second surface 212 facing a direction opposite to the first surface 211, and/or a first side member 213 surrounding at least a portion of a first space between the first surface 211 and the second surface 212. According to an embodiment, the first side member 213 may include a first side 213a having a first length along a first direction (e.g., the x-axis direction), a second side 213c extending from the first side 213a to have a second length longer than the first length along a direction (e.g., the negative y-axis direction) substantially perpendicular to the first side 213a, and a third side 213b extending from the second side 213c substantially parallel to the first side 213a and having the first length.

According to various embodiments, the second housing 220 is connected to the hinge device (e.g., the hinge plate 320 in FIG. 4) in the unfolding state of the electronic device 200, and may have a third surface 221 disposed to face the front of the electronic device 200, a fourth surface 222 facing a direction opposite to the third surface 221, and/or a second side member 223 surrounding at least a portion of a second space between the third surface 221 and the fourth surface 222. According to an embodiment, the second side member 223 may include a first side 223a having a first length along a first direction (e.g., the x-axis direction), a second side 223c extending from the first side 223a to have a second length longer than the first length along a direction (e.g., the negative y-axis direction) substantially perpendicular to the first side 212a, and a third side 223b extending from the second side 223c substantially parallel to the first side 223a and having the first length.

According to various embodiments, the first surface 211 faces substantially the same direction as the third surface 221 in the unfolding state, and at least partially faces the third surface 221 in the folding state.

According to various embodiments, the electronic device 200 may include a recess 201 formed to receive the flexible display 230 through structural coupling of the first and second housings 210 and 220. The recess 201 may have substantially the same size as the flexible display 230.

According to various embodiments, the hinge cover 310 (e.g., a hinge housing) may be disposed between the first housing 210 and the second housing 220. The hinge cover 310 may be disposed to cover a portion (e.g., at least one hinge module) of the hinge device (e.g., the hinge plate 320 in FIG. 4). Depending on whether the electronic device 200 is in the unfolding state, the folding state, or the intermediate state, the hinge cover 310 may be covered by a portion of the first and second housings 210 and 220 or exposed to the outside.

According to various embodiments, when the electronic device 200 is in the unfolding state, at least a portion of the hinge cover 310 may be covered by the first and second housings 210 and 220 and thereby not be substantially exposed. When the electronic device 200 is in the folding state, at least a portion of the hinge cover 310 may be exposed to the outside between the first and second housings 210 and 220. In case of the intermediate state in which the first and second housings 210 and 220 are folded with a certain angle, the hinge cover 310 may be exposed at least in part to the outside of the electronic device 200 between the first and second housings 210 and 220. In this state, the area in which the hinge cover 310 is exposed to the outside may be smaller than that in the fully folding state. The hinge cover 310 may have at least in part a curved surface.

According to various embodiments, when the electronic device 200 is in the unfolding state (e.g., the state shown in FIGS. 2A and 2B), the first and second housings 210 and 220 may form an angle of about 180 degrees, and a first area 230a, a second area 230b, and a folding area 230c of the flexible display 230 may be disposed to form the same plane and to face substantially the same direction (e.g., the z-axis direction). In an embodiment, when the electronic device 200 is in the unfolding state, the first housing 210 may be rotated at an angle of about 360 degrees with respect to the second housing 220 and folded in the opposite direction so that the second surface 212 and the fourth surface 222 face each other (e.g., the out-folding style).

According to various embodiments, when the electronic device 200 is in the folding state (e.g., the state shown in FIGS. 3A and 3B), the first surface 211 of the first housing 210 and the third surface 221 of the second housing 220 may be disposed to face each other. In this case, the first area 230a and the second area 230b of the flexible display 230 may be disposed to face each other while forming a narrow angle (e.g., a range of 0 degrees to about 10 degrees) therebetween through the folding area 230c.

According to various embodiments, the folding area 230c may be deformed at least in part into a curved shape having a predetermined curvature. When the electronic device 200 is in the intermediate state, the first and second housings 210 and 220 may be disposed at a certain angle to each other. In this case, the first area 230a and the second area 230b of the flexible display 230 may form an angle greater than in the folding state and smaller than in the unfolding state, and the curvature of the folding area 230c may be smaller than in the folding state and greater than in the unfolding state.

According to various embodiments, the first and second housings 210 and 220 may stop (e.g., a free stop function) at an angle designated between the folding state and the unfolding state through the hinge device (e.g., the hinge plate 320 in FIG. 4). In various embodiments, the first and second housings 210 and 220 may be continuously operated at designated inflection angles through the hinge device (e.g., the hinge plate 320 in FIG. 4) while being pressed in the unfolding direction or the folding direction.

According to various embodiments, the electronic device 200 may include at least one of at least one display (e.g., the flexible display 230 and the sub-display 300), an input device 215, sound output devices 227 and 228, sensor modules 217a, 217b, and 226, camera modules 216a, 216b, and 225, a key input device 219, an indicator (not shown), and a connector port 229, which are disposed in the first housing 210 and/or the second housing 220. In various embodiments, the electronic device 200 may omit at least one of the above-described components or further include other components.

According to various embodiments, the at least one display (e.g., the flexible display 230 and the sub-display 300) may include the flexible display 230 (e.g., the first display) supported through the first surface 211 of the first housing 210, the hinge device (e.g., the hinge plate 320 in FIG. 4), and the third surface 221 of the second housing 220, and the sub-display 300 (e.g., the second display) disposed to be visible at least in part to the outside through the fourth surface 222 in an inner space of the second housing 220. In various embodiments, the sub-display 300 may be disposed to be visible to the outside through the second surface 212 in an inner space of the first housing 210. According to an embodiment, the flexible display 230 may be mainly used in the unfolding state of the electronic device 200, and the sub-display 300 may be mainly used in the folding state of the electronic device 200. According to an embodiment, in case of the intermediate state, the electronic device 200 may control the flexible display 230 and/or the sub-display 300 to be useable, based on the folding angles between the first and second housings 210 and 220.

According to various embodiments, the flexible display 230 may be disposed in an accommodation space formed by the pair of housings 210 and 220. For example, the flexible display 230 may be disposed in the recess 201 formed by the pair of housings 210 and 220, and in the unfolding state, arranged to occupy substantially most of the front surface of the electronic device 200. According to an embodiment, the flexible display 230 may be changed in shape to a flat surface or a curved surface in at least a partial area. The flexible display 230 may have a first area 230a facing the first housing 210, a second area 230b facing the second housing 220, and a folding area 230c connecting the first area 230a and the second area 230b and facing the hinge device (e.g., the hinge plate 320 in FIG. 4). According to an embodiment, the area division of the flexible display 230 is only an example physical division by the pair of housings 210 and 220 and the hinge device (e.g., the hinge plate 320 in FIG. 4), and substantially the flexible display 230 may be realized as one seamless full screen over the pair of housings 210 and 220 and the hinge device (e.g., the hinge plate 320 in FIG. 4). The first area 230a and the second area 230b may have an overall symmetrical shape or a partially asymmetrical shape with respect to the folding area 230c.

According to various embodiments, the electronic device 200 may include a first rear cover 240 disposed on the second surface 212 of the first housing 210 and a second rear cover 250 disposed on the fourth surface 222 of the second housing 220. In various embodiments, at least a portion of the first rear cover 240 may be integrally formed with the first side member 213. In various embodiments, at least a portion of the second rear cover 250 may be integrally formed with the second side member 223. According to an embodiment, at least one of the first rear cover 240 and the second rear cover 250 may be formed with a substantially transparent plate (e.g., a glass plate having various coating layers, or a polymer plate) or an opaque plate.

According to various embodiments, the first rear cover 240 may be formed with an opaque plate such as, for example, coated or colored glass, ceramic, polymer, metal (e.g., aluminum, stainless steel (STS), or magnesium), or any combination thereof. The second rear cover 250 may be formed with a substantially transparent plate such as glass or polymer, for example. In this case, the second display 300 may be disposed to be visible from the outside through the second rear cover 250 in the inner space of the second housing 220.

According to various embodiments, the input device 215 may include a microphone. In various embodiments, the input device 215 may include a plurality of microphones arranged to detect the direction of sound.

According to various embodiments, the sound output devices 227 and 228 may include speakers. According to an embodiment, the sound output devices 227 and 228 may include a receiver 227 for a call disposed through the fourth surface 222 of the second housing 220, and an external speaker 228 disposed through at least a portion of the second side member 223 of the second housing 220. In various embodiments, the input device 215, the sound output devices 227 and 228, and the connector 229 may be disposed in spaces of the first housing 210 and/or the second housing 220 and exposed to the external environment through at least one hole formed in the first housing 210 and/or the second housing 220. In various embodiments, the holes formed in the first housing 210 and/or the second housing 220 may be commonly used for the input device 215 and the sound output devices 227 and 228. In various embodiments, the sound output devices 227 and 228 may include a speaker (e.g., a piezo speaker) that is operated without holes formed in the first housing 210 and/or the second housing 220.

According to various embodiments, the camera modules 216a, 216b, and 225 may include a first camera module 216a disposed on the first surface 211 of the first housing 210, a second camera module 216b disposed on the second surface 212 of the first housing 210, and/or a third camera module 225 disposed on the fourth surface 222 of the second housing 220. According to an embodiment, the electronic device 200 may include a flash 218 disposed near the second camera module 216b. The flash 218 may include, for example, a light emitting diode or a xenon lamp. According to an embodiment, the camera modules 216a, 216b, and 225 may include one or more lenses, an image sensor, and/or an image signal processor. In various embodiments, at least one of the camera modules 216a, 216b, and 225 may include two or more lenses (e.g., wide-angle and telephoto lenses) and image sensors and may be disposed together on one surface of the first housing 210 and/or the second housing 220.

According to various embodiments, the sensor modules 217a, 217b, and 226 may generate an electrical signal or data value corresponding to an internal operating state of the electronic device 200 or an external environmental state. According to an embodiment, the sensor modules 217a, 217b, and 226 may include a first sensor module 217a disposed on the first surface 211 of the first housing 210, a second sensor module 217b disposed on the second surface

212 of the first housing 210, and/or a third sensor module 226 disposed on the fourth surface 222 of the second housing 220. In various embodiments, the sensor modules 217a, 217b, and 226 may include at least one of a gesture sensor, a grip sensor, a color sensor, an infrared (IR) sensor, an illumination sensor, an ultrasonic sensor, an iris recognition sensor, or a distance detection sensor (e.g., a time of flight (TOF) sensor or a light detection and ranging (LiDAR)).

According to various embodiments, the electronic device 200 may further include an unillustrated sensor module, for example, at least one of a barometric pressure sensor, a magnetic sensor, a biometric sensor, a temperature sensor, a humidity sensor, or a fingerprint recognition sensor. In various embodiments, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In various embodiments, the key input device 219 may be disposed to be exposed to the outside through the second side member 223 of the second housing 220. In various embodiments, the electronic device 200 may not include some or all of the key input devices 219, and the non-included key input device may be implemented in another form, such as a soft key, on at least one of the displays 230 and 300. In an embodiment, the key input device 219 may be implemented using a pressure sensor included in at least one of the displays 230 and 300.

According to various embodiments, the connector port 229 may include a connector (e.g., a USB connector or an interface connector port module (IF module)) for transmitting and receiving power and/or data to and from an external electronic device (e.g., the external electronic device 102, 104, or 108 in FIG. 1). In various embodiments, the connector port 229 may also perform a function of transmitting and receiving an audio signal to and from an external electronic device or further include a separate connector port (e.g., an ear jack hole) for performing the function of audio signal transmission and reception.

According to various embodiments, at least one 216a, 225 of the camera modules 216a, 216b, and 225, at least one 217a, 226 of the sensor modules 217a, 217b, and 226, and/or the indicator may be arranged to be exposed through at least one of the displays 230 and 300. For example, the at least one camera module 216a and/or 225, the at least one sensor module 217a and/or 226, and/or the indicator may be disposed under an active area (display area) of at least one of the displays 230 and 300 in the inner space of at least one of the housings 210 and 220 so as to be in contact with the external environment through a transparent region or an opening perforated up to a cover member (e.g., a window layer (not shown) of the flexible display 230 and/or the second rear cover 250). According to an embodiment, a region where the display 230 or 300 and the camera module 216a or 225 face each other is a part of the display area and may be formed as a transmissive region having a certain transmittance. According to an embodiment, the transmissive region may be formed to have a transmittance in a range of about 5% to about 20%. The transmissive region may have an area that overlaps with an effective area (e.g., an angle of view area) of the camera module 216a or 225 through which light for generating an image at an image sensor passes. For example, the transmissive region of the at least one display 230 and/or 300 may have an area having a lower density of pixels than the surrounding area. For example, the transmissive region may replace the opening. For example, the at least one camera module 216a and/or 225 may include an under display camera (UDC) or an under panel camera (UPC). In an embodiment, some camera modules or sensor modules 217a and 226 may be disposed to perform their functions without being visually exposed through the display. For example, a region facing the camera modules 216a and 225 and/or the sensor modules 217a and 226 disposed under the at least one display 230 and/or 300 (e.g., a display panel) has an under display camera (UDC) structure that may not require a perforated opening.

FIG. 4 is an exploded perspective view illustrating an electronic device according to various embodiments.

With reference to FIG. 4, the electronic device 200 may include a flexible display 230 (e.g., a first display), a sub-display 300 (e.g., a second display), a hinge plate 320, a pair of support members (e.g., a first support member 261, a second support member 262), at least one substrate 270 (e.g., a printed circuit board (PCB)), a first housing 210, a second housing 220, a first rear cover 240, and/or a second rear cover 250.

According to various embodiments, the flexible display 230 may include a display panel 430 (e.g., a flexible display panel), a support plate 450 disposed under (e.g., in the negative z-axis direction) the display panel 430, and a pair of metal plates 461 and 462 disposed under (e.g., in the negative z-axis direction) the support plate 450.

According to various embodiments, the display panel 430 may include a first panel area 430a corresponding to a first area (e.g., the first area 230a in FIG. 2A) of the flexible display 230, a second panel area 430b extending from the first panel area 430a and corresponding to a second area (e.g., the second area 230b in FIG. 2A) of the flexible display 230, and a third panel area 430c connecting the first panel area 430a and the second panel area 430b and corresponding to a folding area (e.g., the folding area 230c in FIG. 2A) of the flexible display 230.

According to various embodiments, the support plate 450 may be disposed between the display panel 430 and the pair of support members 261 and 262 and formed to have a material and shape for providing a planar support structure for the first and second panel areas 430a and 430b and providing a bendable structure to aid in flexibility of the third panel region 430c. According to an embodiment, the support plate 450 may be formed of a conductive material (e.g., metal) or a non-conductive material (e.g., polymer or fiber reinforced plastics (FRP)). According to an embodiment, the pair of metal plates 461 and 462 may include a first metal plate 461 disposed to correspond to at least a portion of the first and third panel areas 430a and 430c between the support plate 450 and the pair of support members 261 and 262, and a second metal plate 462 disposed to correspond to at least a portion of the second and third panel areas 430b and 430c. According to an embodiment, the pair of metal plates 461 and 462 may be formed of a metal material (e.g., SUS), thereby helping to reinforce a ground connection structure and rigidity for the flexible display 230.

According to various embodiments, the sub-display 300 may be disposed in a space between the second housing 220 and the second rear cover 250. According to an embodiment, the sub-display 300 may be disposed to be visible from the outside through substantially the entire area of the second rear cover 250 in the space between the second housing 220 and the second rear cover 250.

According to various embodiments, at least a portion of the first support member 261 may be foldably combined with the second support member 262 through the hinge plate 320. According to an embodiment, the electronic device 200 may include at least one wiring member 263 (e.g., a flexible printed circuit board (FPCB)) disposed from at least a portion of the first support member 261 to a portion of the second support member 262 across the hinge plate 320. According to an embodiment, the first support member 261 may be disposed in such a way that it extends from the first side member 213 or is structurally combined with the first side member 213. According to an embodiment, the electronic device 200 may have a first space (e.g., the first space 2101 in FIG. 2A) provided through the first support member 261 and the first rear cover 240.

According to various embodiments, the first housing 210 (e.g., a first housing structure) may be configured through a combination of the first side member 213, the first support member 261, and the first rear cover 240. According to an embodiment, the second support member 262 may be disposed in such a way that it extends from the second side member 223 or is structurally combined with the second side member 223. According to an embodiment, the electronic device 200 may have a second space (e.g., the second space 2201 in FIG. 2A) provided through the second support member 262 and the second rear cover 250.

According to various embodiments, the second housing 220 (e.g., a second housing structure) may be configured through a combination of the second side member 223, the second support member 262, and the second rear cover 250. According to an embodiment, at least a portion of the at least one wiring member 263 and/or the hinge plate 320 may be disposed to be supported through at least a portion of the pair of support members 261 and 262. According to an embodiment, the at least one wiring member 263 may be disposed in a direction (e.g., the x-axis direction) that crosses the first and second support members 261 and 262. According to an embodiment, the at least one wiring member 263 may be disposed in a direction (e.g., the x-axis direction) substantially perpendicular to the folding axis (e.g., the y-axis or the folding axis A in FIG. 2A).

According to various embodiments, the at least one substrate 270 may include a first substrate 271 disposed in the first space 2101 and a second substrate 272 disposed in the second space 2201. According to an embodiment, the first substrate 271 and the second substrate 272 may include at least one electronic component disposed to implement various functions of the electronic device 200. According to an embodiment, the first substrate 271 and the second substrate 272 may be electrically connected to each other through the at least one wiring member 263.

According to various embodiments, the electronic device 200 may include at least one battery 291 and 292. According to an embodiment, the at least one battery 291 and 292 may include a first battery 291 disposed in the first space 2101 of the first housing 210 and electrically connected to the first substrate 271, and a second battery 292 disposed in the second space 2201 of the second housing 220 and electrically connected to the second substrate 272. According to an embodiment, the first and second support members 261 and 262 may further have at least one swelling hole for the first and second batteries 291 and 292.

According to various embodiments, the first housing 210 may have a first rotation support surface 214, and the second housing 220 may have a second rotation support surface 224 corresponding to the first rotation support surface 214. According to an embodiment, the first and second rotation support surfaces 214 and 224 may have curved surfaces corresponding to the curved outer surface of the hinge cover 310. According to an embodiment, when the electronic device 200 is in the unfolding state, the first and second rotational support surfaces 214 and 224 may cover the hinge cover 310 so as not to expose or so as to partially expose the hinge cover 310 to the rear surface of the electronic device 200. According to an embodiment, when the electronic device 200 is in the folding state, the first and second rotational support surfaces 214 and 224 may rotate along the curved outer surface of the hinge cover 310 and thereby expose at least in part the hinge cover 310 to the rear surface of the electronic device 200.

According to various embodiments, the electronic device 200 may include at least one antenna 276 disposed in the first space 2201. According to an embodiment, the at least one antenna 276 may be disposed between the first battery 291 and the first rear cover 240 in the first space 2201. According to an embodiment, the at least one antenna 276 may include, for example, a near field communication (NFC) antenna, a wireless charging antenna, and/or a magnetic secure transmission (MST) antenna. According to an embodiment, the at least one antenna 276 may perform short-range communication with an external device or wirelessly transmit/receive power required for charging, for example. In various embodiments, the antenna structure may be formed by at least a portion of the first side member 213 or the second side member 223, a portion of the first and second support members 261 and 262, or a combination thereof.

According to various embodiments, the electronic device 200 may further include at least one electronic component assembly 274 and 275) and/or additional support members 273 and 277 disposed in the first space 2101 and/or the second space 2201. For example, the at least one electronic component assembly 274 and 275 may include an interface connector port assembly 274 or a speaker assembly 275.

Figure 5:
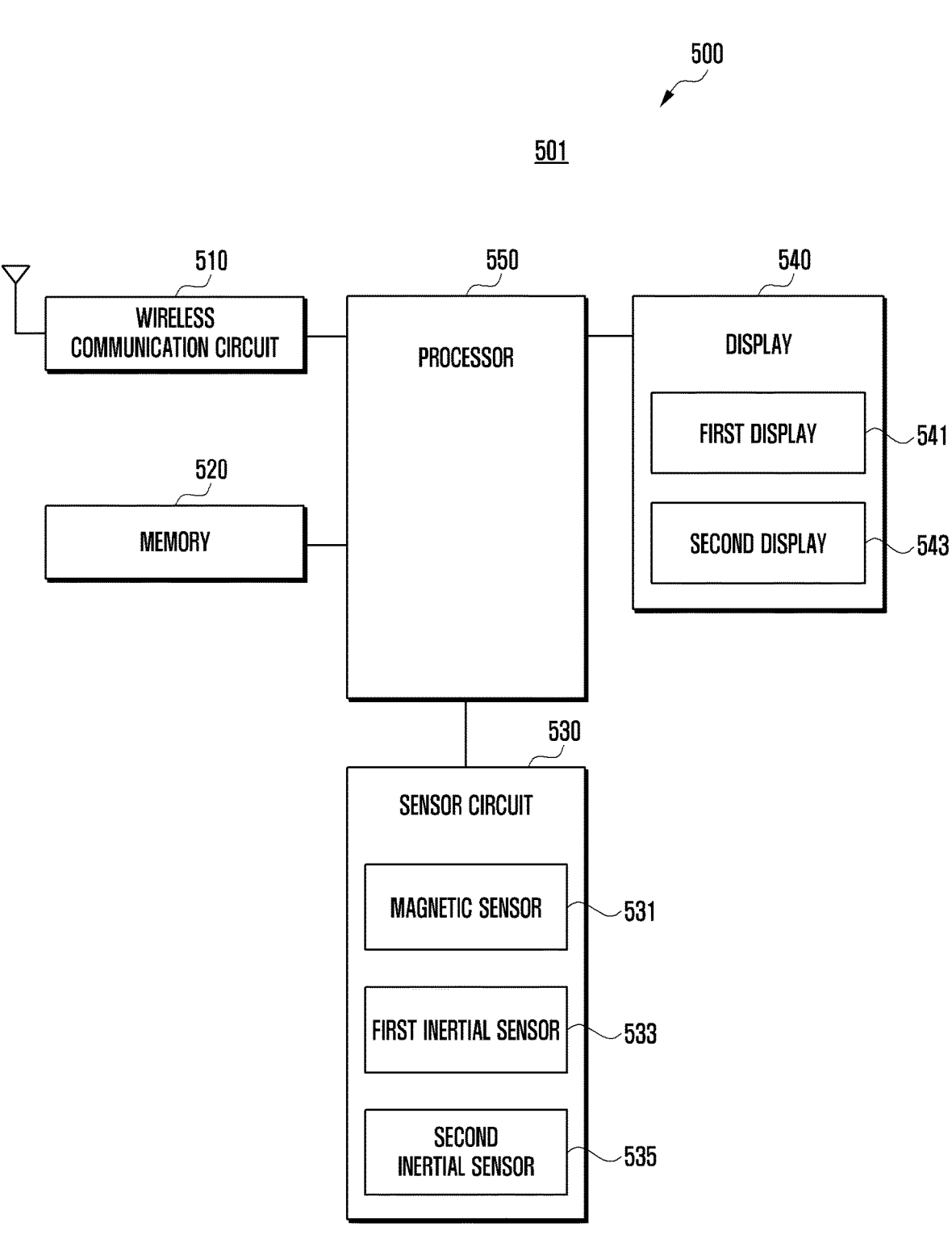
FIG. 5 is a block diagram illustrating an example configuration of an electronic device, according to various embodiments.

FIG. 5 is a block diagram 500 illustrating an example configuration of an electronic device 501, according to various embodiments.

With reference to FIG. 5, the electronic device 501 (e.g., electronic device 101 in FIG. 1 and electronic device 200 in FIGS. 2A to 4) may include a wireless communication circuit 510 (e.g., communication module 190 in FIG. 1), a memory 520 (e.g., memory 130 in FIG. 1), a sensor circuit 530 (e.g., sensor module 176 in FIG. 1), a display 540 (e.g., display module 160 in FIG. 1 and displays 230 and 300 in FIGS. 2A to 4), and/or a processor (e.g., including processing circuitry) 550 (e.g., processor 120 in FIG. 1).

According to an embodiment of the present disclosure, the wireless communication circuit 510 (e.g., communication module 190 in FIG. 1) may establish a communication channel with an external electronic device (e.g., electronic device 102 in FIG. 1) and support transmitting and receiving various data to and from the external electronic device.

In an embodiment, the wireless communication circuit 510 may, under the control of the processor 550, connect communication between the electronic device 501 and an external electronic device (e.g., a wearable electronic device (e.g., a smart ring, a smart watch)). When connected in communication with an external electronic device (e.g., a wearable electronic device), the wireless communication circuit 510 may, under the control of the processor 550, receive sensor information (e.g., sensor information related to movement of an external electronic device (e.g., a wearable electronic device)) obtained from a sensor circuit (not illustrated) (e.g., an inertial sensor) of the external electronic device (e.g., a wearable electronic device) from the external electronic device (e.g., a wearable electronic device).

According to an embodiment of the present disclosure, the memory 520 (e.g., memory 130 in FIG. 1) may perform a function of storing a program (e.g., program 140 in FIG. 1), an operating system (OS) (e.g., operating system 142 in FIG. 1), various applications, and/or input/output data for processing and controlling the processor 550 of the electronic device 501, and may store a program that controls an overall operation of the electronic device 501. The memory 520 may store various instructions that may be executed by the processor 550.

In an embodiment, the memory 520 may store instructions for detecting a state of the electronic device 501 (e.g., an unfolded state (e.g., the state in FIGS. 2A and 2B) or a folded state (e.g., the state in FIGS. 3A and 3B)) using at least one sensor included in the sensor circuit 530, e.g., a magnetic sensor 531. In an embodiment, the memory 520 may store instructions for detecting a state (e.g., an unfolded state or a folded state) of the electronic device 501 on the basis of a change in an angle between the first housing 210 and the second housing 220 of the electronic device 501.

In an embodiment, the memory 520 may store instructions for determining a posture of the electronic device 501 on the basis of sensing information from at least one sensor included in the sensor circuit 530, for example, first sensing information obtained (or measured) through a first inertial sensor 533 and second sensing information obtained (or measured) through a second inertial sensor 535. In an embodiment, the memory 520 may store instructions for determining the posture of the electronic device 501 on the basis of time information during which an angle between the first housing 210 and the second housing 220 of the electronic device 501 is changed to a designated angle.

In an embodiment, the memory 520 may store instructions for setting a direction of a screen into a display mode (e.g., a landscape mode or a portrait mode) corresponding to the posture of the electronic device 501 when the electronic device 501 is switched to an unfolded state, and displaying the screen on a first display 541 in the set display mode.

According to an embodiment of the present disclosure, the sensor circuit 530 (e.g., sensor module 176 in FIG. 1) may measure a physical quantity or detect an operational state of the electronic device 501 to generate a corresponding electrical signal or data value.

In an embodiment, the sensor circuit 530 may include the magnetic sensor 531 (e.g., a hall IC), the first inertial sensor 533, and/or the second inertial sensor 535.

In an embodiment, the magnetic sensor 531 (e.g., a hall IC) may obtain (or measure) sensing information for detecting an unfolded state (or folded state) of the electronic device 501, and transmit the obtained (or measured) sensing information to the processor 550.

In an embodiment, the first inertial sensor 533 and the second inertial sensor 535 may include a six-axis sensor (e.g., a geomagnetic sensor, an acceleration sensor, and/or a gyro sensor). The first inertial sensor 533 and the second inertial sensor 535 may obtain (or measure) sensing information (e.g., sensing information (e.g., a sensing value, a sensing angle) of x-axis, y-axis, and/or z-axis) for determining the posture of the electronic device 501, and transmit the obtained (or measured) sensing information (e.g., sensing information (e.g., a sensing value, a sensing angle) of x-axis, y-axis, and/or z-axis) to the processor 550.

In an embodiment, the first inertial sensor 533 is included in the first housing 210, and the second inertial sensor 535 may be included in the second housing 220.

According to an embodiment of the present disclosure, the display 540 (e.g., display module 160 in FIG. 1, displays 230 and 300 in FIGS. 2A to 4) is configured as an integrated unit including a touch panel (not illustrated), and may display an image under the control of the processor 550.

In an embodiment, the display 540 may include a first display 541 (e.g., first display 230 in FIG. 2A) and a second display 543 (e.g., second display 300 in FIG. 2B). In an embodiment, the first display 541 may be activated when the electronic device 501 is in an unfolded state and deactivated when the electronic device 501 is in a folded state, under the control of the processor 550. The second display 543 may be activated when the electronic device 501 is in a folded state and deactivated when the electronic device 501 is in an unfolded state, under the control of the processor 550.

In an embodiment, the first display 541 or the second display 543 may, under the control of the processor 550, display the screen set to a display mode corresponding to the posture of the electronic device 501.

According to an embodiment of the present disclosure, for example, the processor 550 may include various processing circuitry, including, for example, a microcontroller unit (MCU) and control a plurality of hardware elements connected to the processor 550 by operating an operating system (OS) or an embedded software program. The processor 550 may control a plurality of hardware elements, for example, according to instructions stored in the memory 520 (e.g., program 140 in FIG. 1). The processor 550 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment, the processor 550 may detect that the electronic device 501 is switched from a folded state (e.g., the state in FIGS. 3A and 3B) to an unfolded state (e.g., the state in FIGS. 2A and 2B). For example, the processor 550 may detect that the electronic device 501 is switched in a folding state from a folded state to an unfolded state on the basis of sensor information obtained through the magnetic sensor 531 and/or the inertial sensor (e.g., first inertial sensor 533 and second inertial sensor 535).

In an embodiment, the processor 550 may determine the posture of the electronic device 501 on the basis of the first sensing information on the first inertial sensor 533, the second sensing information on the second inertial sensor 535, and the time information during which the angle between the first housing 210 and the second housing 220 is changed to a designated angle. In an embodiment, the posture of the electronic device 501 may include direction information on the electronic device 501 (e.g., a landscape mode or a portrait mode) and a state of resting on the ground (e.g., a floor or a desk) or a state of not resting on the ground. For example, the posture of the electronic device 501 may include a state of resting on the ground in a landscape mode, a state of not resting on the ground in a landscape mode, a state of resting on the ground in a portrait mode, and a state of not resting on the ground in a portrait mode.

In an embodiment, the processor 550 may, when the electronic device 501 is in a folded state, measure a sensor value on a specific axis, e.g., the x-axis, through each of the first inertial sensor 533 and the second inertial sensor 535, and determine the posture of the electronic device 501 on the basis of the sensor value of each of the first inertial sensor 533 and the second inertial sensor 535 measured on the x-axis.

In an embodiment, the processor 550 may identify whether a time during which the angle between the first housing 210 and the second housing 220 is changed to a designated angle (e.g., about 180 degrees) is equal to or less than a designated time (e.g., about 1.5 seconds). The processor 550 may determine the posture of the electronic device 501 on the basis of whether the time that the angle between the first housing 210 and the second housing 220 is changed to a designated angle (e.g., about 180 degrees) is equal to or less than a designated time (e.g., about 1.5 seconds).

In an embodiment, the processor 550 may, when a value of the angle between the first housing 210 and the second housing 220 exceeds a designated angle, identify whether a differential value of a first sensor value of the first inertial sensor 533 and a second sensor value of the second inertial sensor 535 measured on a specific axis (e.g., x-axis or z-axis) is less than a designated value. The processor 550 may determine the posture of the electronic device 501 on the basis of whether the differential value of the first sensor value of the first inertial sensor 533 and the second sensor value of the second inertial sensor 535 measured in a specific axis (e.g., x-axis or z-axis) is less than a designated value.

In an embodiment, the processor 550 may monitor a rotation state of the electronic device 501 in a state in which direction information on the electronic device 501 is in a portrait mode, and identify whether a rotation of the electronic device 501 is detected on the basis of a result of the monitoring. The processor 550 may, when the rotation of the electronic device 501 is detected, identify a rotation angle to determine the posture of the electronic device 501.

In an embodiment, the processor 550 may determine the posture of the electronic device 501 on the basis of information related to a contact of the hinge module 320 (e.g., grip position and/or grip pattern) obtained through a grip sensor (not illustrated) disposed on at least a portion of the hinge module (e.g., hinge plate 320 in FIG. 4).

In an embodiment, the processor 550 may receive sensor information on an external electronic device (e.g., a wearable electronic device (e.g., a smart watch, a smart ring)) connected in communication through the wireless communication circuit 510, and determine the posture of the electronic device 501 on the basis of the received sensor information on the external electronic device.

In an embodiment, the processor 550 may, when the electronic device 501 is switched to an unfolded state (e.g., the state in FIGS. 2A and 2B), set a direction of the screen into a display mode (e.g., a landscape mode or a portrait mode) corresponding to the determined posture of the electronic device 501 and display the screen on the first display 541.

In an embodiment, when the posture of the electronic device 501 is identified as being in a state of resting on the ground in a landscape mode on the basis of the electronic device 501 being switched to an unfolded state, the processor 550 may set the direction of the screen to a horizontal direction to display the screen on the first display 541.

In an embodiment, when the posture of the electronic device 501 is identified as being in a state of not resting on the ground in a landscape mode on the basis of the electronic device 501 being switched to an unfolded state, the processor 550 may set the direction of the screen to a horizontal direction to display the screen on the first display 541.

In an embodiment, when the posture of the electronic device 501 is identified as being in a state of resting on the ground in a portrait mode on the basis of the electronic device 501 being switched to an unfolded state, the processor 550 may set the direction of the screen to a vertical direction to display the screen on the first display 541.

In an embodiment, when the posture of the electronic device 501 is identified as being in a state of not resting on the ground in a portrait mode on the basis of the electronic device 501 being switched to an unfolded state, the processor 550 may set the direction of the screen to a vertical direction to display the screen on the first display 541.

The electronic devices, according to an example embodiment of the present disclosure, may include: a hinge module including a hinge; a first housing connected to the hinge module and including a first surface, a second surface facing in a direction opposite to the first surface, and a first side surface surrounding a first space between the first surface and the second surface; a second housing connected to the hinge module and configured to be foldable with respect to the first housing, and includes, in an unfolded state, a third surface facing in the same direction as the first surface, a fourth surface facing in a direction opposite to the third surface, and a second side surface surrounding a second space between the third surface and the fourth surface; a first display disposed to be visible from at least a portion of the first surface of the first housing to at least a portion of the third surface of the second housing; a second display disposed as visible via at least a portion of the fourth surface of the second housing; a first inertial sensor disposed in the first housing; a second inertial sensor 535 disposed in the second housing; a memory; at least one processor, comprising processing circuitry, operatively connected with the first display, the second display, the first inertial sensor, the second inertial sensor, and the memory, wherein at least one processor, individually and/or collectively, may be configured to: based on a switch of the electronic device from a folded state to an unfolded state being detected, determine the posture of the electronic device based on the first sensing information on the first inertial sensor, the second sensing information on the second inertial sensor, and the time information that the angle between the first housing and the second housing is changed to a designated angle; and set the direction of the screen into a display mode corresponding to the determined posture of the electronic device to display the screen on the first display.

In an example embodiment, at least one processor, individually and/or collectively, may be configured to detect a switch of the electronic device from a folded state to an unfolded state based on whether a sensor value obtained through the magnetic sensor has a designated sensor value and whether a value of the angle between the first housing and the second housing exceeds a designated angle.

In an example embodiment, at least one processor, individually and/or collectively, may be configured to: identify whether the first sensing information on the first inertial sensor and the second sensing information on the second inertial sensor have a designated value; based on the first sensing information on the first inertial sensor and the second sensing information on the second inertial sensor having a designated value, identify whether the time during which the angle between the first housing and the second housing is changed to a designated angle is equal to or less than a designated time; based on the time during which the angle between the first housing and the second housing being changed to a designated angle is equal to or less than a designated time, determine the posture of the electronic device to be in a state of not resting on the ground in a portrait mode.

In an example embodiment, at least one processor, individually and/or collectively, may be configured to: based on the time during which the angle between the first housing and the second housing being changed to a designated angle not equal to or less than a designated time, determine the posture of the electronic device to be in a state of resting on the ground in a portrait mode.

In an example embodiment, at least one processor, individually and/or collectively, may be configured to: identify whether the first sensing information on the first inertial sensor and the second sensing information on the second inertial sensor have a designated value; based on the first sensing information on the first inertial sensor and the second sensing information on the second inertial sensor not having a designated value, identify whether the time during which the angle between the first housing and the second housing is changed to a designated angle is equal to or less than a designated time; and based on the time during which the angle between the first housing and the second housing being changed to a designated angle equal to or less than a designated time, determine the posture of the electronic device to be in a state of not resting on the ground in a landscape mode.

In an example embodiment, at least one processor, individually and/or collectively, may be configured to: based on the time during which the angle between the first housing and the second housing being changed to a designated angle exceeds a designated time, determine the posture of the electronic device to be in a state of resting on the ground in a landscape mode.

In an example embodiment, at least one processor, individually and/or collectively, may be configured to: identify whether the value of the angle between the first housing and the second housing exceeds a designated angle; based on the value of the angle between the first housing and the second housing exceeding a designated angle, identify whether the differential value of the first sensing information on the first inertial sensor and the second sensing information on the second inertial sensor measured on a specific axis is less than a designated value; determine that the posture of the electronic device is in a portrait mode based on the differential value of the first sensing information on the first inertial sensor and the second sensing information on the second inertial sensor measured on a specific axis being less than a designated value; and determine the posture of the electronic device to be in a landscape mode based on the differential value of the first sensing information on the first inertial sensor and the second sensing information on the second inertial sensor measured on a specific axis being equal to or greater than a designated value.

In an example embodiment, the electronic device may further include a grip sensor disposed on at least a portion of the hinge module.

In an example embodiment, at least one processor, individually and/or collectively, may be configured to: obtain information related to a contact of the hinge module through the grip sensor disposed on at least a portion of the hinge module; and determine the posture of the electronic device based on the information obtained related to a contact of the hinge module.

In an example embodiment, the information related to a contact of the hinge module may include at least one of a grip position and a grip pattern obtained through the grip sensor disposed on at least a portion of the hinge module.

In an example embodiment, at least one processor, individually and/or collectively, may be configured to: based on the posture of the electronic device being determined to be in a portrait mode, set the direction of the screen into a portrait mode, and display the screen in the set portrait mode on the first display; and based on the posture of the electronic device being determined to be in a landscape mode, set the direction of the screen into a landscape mode, and display the screen in the set landscape mode on the first display.

Figure 6:
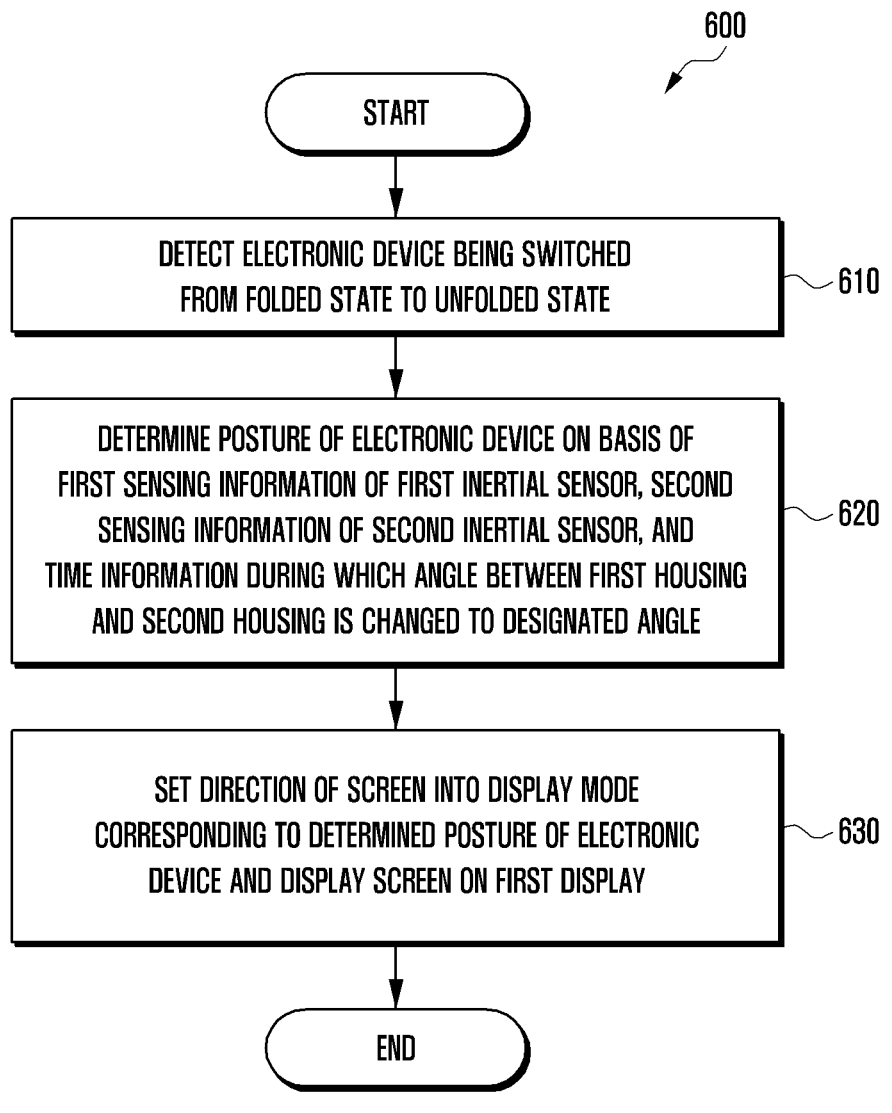
FIG. 6 is a flowchart illustrating an example method of displaying a screen according to an electronic device being switched in a folding state, according to various embodiments.

FIG. 6 is a flowchart illustrating an example method of displaying a screen according to the electronic device 501 being switched in a folding state, according to various embodiments.

In embodiments below, each operation may be performed sequentially, but is not required to be performed sequentially. For example, the order of each operation may be changed, and at least two operations may be performed in parallel.

According to an embodiment, it may be understood that operations 610 to 630 may be performed on the processor (e.g., processor 550 in FIG. 5) of the electronic device (e.g., electronic device 501 in FIG. 5).

With reference to FIG. 6, the processor 550 of the electronic device 501 may, at operation 610, detect a switch of the electronic device 501 from a folded state (e.g., the state in FIG. 3A and FIG. 3B) to an unfolded state (e.g., the state in FIG. 2A and FIG. 2B). For example, the processor 550 may detect a folding state of the electronic device 501 being switched from a folded state to an unfolded state through a sensor circuit (e.g., sensor circuit 530 in FIG. 5). In an embodiment, the sensor circuit 530 may include a magnetic sensor (e.g., magnetic sensor 531 in FIG. 5) and/or an inertial sensor (e.g., first inertial sensor 533 and second inertial sensor 535 in FIG. 5). The processor 550 may detect a folding state of the electronic device 501 being switched from a folded state to an unfolded state on the basis of sensor information obtained through the magnetic sensor 531 and/ or sensor information obtained through the inertial sensor 533 or 535.

With regard to operation 610 of detecting a switch of electronic device 501 from a folded state to an unfolded state, various embodiments will be described in greater detail below with reference to FIG. 7.

In an embodiment, when the electronic device 501 is in a folded state (e.g., the state in FIGS. 3A and 3B), the first surface 211 of the first housing (e.g., first housing 210 in FIGS. 2A and 2B) and the third surface 221 of the second housing (e.g., second housing 220 in FIGS. 2A and 2B) may be disposed to face each other. For example, when the electronic device 501 is in a folded state (e.g., the state in FIG. 3A and FIG. 3B), the first housing 210 and the second housing 220 may form a narrow angle with each other (e.g., a range of about zero degrees to about 10 degrees). In this case, the second display (e.g., the second display 543 in FIG. 5) of the display (e.g., the display 540 in FIG. 5) may be activated.

In an embodiment, the processor 550 may, at operation 620, determine the posture of the electronic device 501 on the basis of the first sensing information on the first inertial sensor 533, the second sensing information on the second inertial sensor 535, and the time information during which the angle between the first housing 210 and the second housing 220 is changed to a designated angle.

In various embodiments, the posture of the electronic device 501 may include direction information on the electronic device 501 (e.g., a landscape mode or a portrait mode) and a state of resting on the ground (e.g., a floor or a desk) or a state of not resting on the ground. For example, the posture of the electronic device 501 may include a state of resting on the ground in a landscape mode, a state of not resting on the ground in a landscape mode, a state of resting on the ground in a portrait mode, and a state of not resting on the ground in a portrait mode. However, the present disclosure is not limited thereto.

For example, the processor 550 may, when the electronic device 501 is in a folded state, measure a sensor value on a specific axis, e.g., the x-axis, through each of the first inertial sensor 533 and the second inertial sensor 535, and determine the posture of the electronic device 501 on the basis of the sensor value of each of the first inertial sensor 533 and the second inertial sensor 535 measured on the x-axis.

For another example, the processor 550 may identify whether a time during which the angle between the first housing 210 and the second housing 220 is changed to a designated angle (e.g., about 180 degrees) is equal to or less than a designated time (e.g., about 1.5 seconds). The processor 550 may determine the posture of the electronic device 501 on the basis of whether the time that the angle between the first housing 210 and the second housing 220 is changed to a designated angle (e.g., about 180 degrees) is equal to or less than a designated time (e.g., about 1.5 seconds).

For another example, the processor 550 may, when a value of the angle between the first housing 210 and the second housing 220 exceeds a designated angle, identify whether a differential value of a first sensor value of the first inertial sensor 533 and a second sensor value of the second inertial sensor 535 measured on a specific axis (e.g., x-axis or z-axis) is less than a designated value. The processor 550 may determine the posture of the electronic device 501 on the basis of whether the differential value of the first sensor value of the first inertial sensor 533 and the second sensor value of the second inertial sensor 535 measured in a specific axis (e.g., x-axis or z-axis) is less than a designated value.

For another example, the processor 550 may monitor a rotation state of the electronic device 501 in a state in which direction information on the electronic device 501 is in a portrait mode, and identify whether a rotation of the electronic device 501 is detected on the basis of a result of the monitoring. When a rotation of the electronic device 501 is detected, the posture of the electronic device 501 may be determined on the basis of a rotation angle.

For another example, the processor 550 may determine the posture of the electronic device 501 on the basis of information related to a contact of the hinge module 320 (e.g., grip position and/or grip pattern) obtained through a grip sensor disposed on at least a portion of the hinge module (e.g., hinge plate 320 in FIG. 4).

For another example, the processor 550 may receive sensor information on an external electronic device (e.g., a wearable electronic device (e.g., a smart watch, a smart ring)) connected in communication through the wireless communication circuit (e.g., wireless communication circuit 510 in FIG. 5), and determine the posture of the electronic device 501 on the basis of the received sensor information on the external electronic device.

With regard to operation 620 of determining the posture of electronic device 501 as described above, various embodiments will be described in greater detail below with reference to FIGS. 8 to 17.

In an embodiment, the processor 550 may, at operation 630, set a direction of the screen into a display mode (e.g., a landscape mode or a portrait mode) corresponding to the determined posture of the electronic device 501 and display the screen on the first display 541. For example, when the electronic device 501 is switched to an unfolded state, the second display 543 may be deactivated and the first display (e.g., first display 541 in FIG. 5) may be activated. When the electronic device 501 is switched to an unfolded state, the processor 550 may display the screen in the set display mode through the activated first display 541.

For example, when the posture of the electronic device 501 is identified as being in a state of resting on the ground in a landscape mode on the basis of the electronic device 501 being switched to an unfolded state, the processor 550 may set the direction of the screen to a horizontal direction to display the screen on the first display 541.

For example, when the posture of the electronic device 501 is identified as being in a state of not resting on the ground in a landscape mode on the basis of the electronic device 501 being switched to an unfolded state, the processor 550 may set the direction of the screen to a horizontal direction to display the screen on the first display 541.

For example, when the posture of the electronic device 501 is identified as being in a state of resting on the ground in a portrait mode on the basis of the electronic device 501 being switched to an unfolded state, the processor 550 may set the direction of the screen to a vertical direction to display the screen on the first display 541.

For example, when the posture of the electronic device 501 is identified as being in a state of not resting on the ground in a portrait mode on the basis of the electronic device 501 being switched to an unfolded state, the processor 550 may set the direction of the screen to a vertical direction to display the screen on the first display 541.

Figure 7:
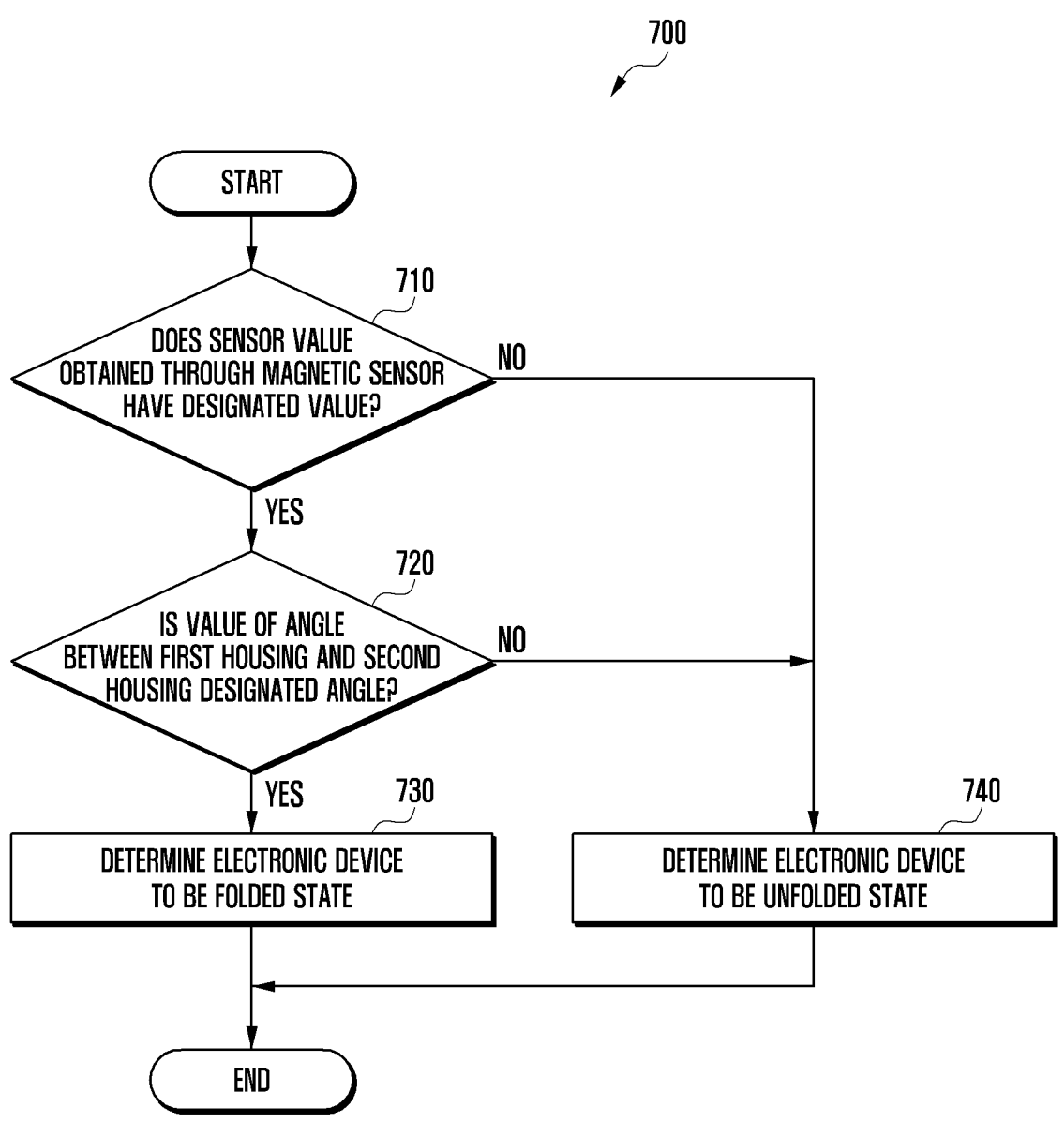
FIG. 7 is a flowchart illustrating an example method of detecting an electronic device being switched in a folding state, according to various embodiments.

FIG. 7 is a flowchart 700 illustrating an example method of detecting the electronic device 501 being switched in a folding state, according to various embodiments.

In embodiments below, each operation may be performed sequentially, but is not required to be performed sequentially. For example, the order of each operation may be changed, and at least two operations may be performed in parallel.

According to an embodiment, it may be understood that operations 710 to 740 may be performed on the processor (e.g., processor 550 in FIG. 5) of the electronic device (e.g., electronic device 501 in FIG. 5).

FIG. 7 may correspond to operation 610 in FIG. 6 described above, according to various embodiments.

With reference to FIG. 7, the processor 550 of the electronic device 501 may, at operation 710, identify whether a sensor value obtained through a magnetic sensor (e.g., a hall IC) (e.g., magnetic sensor 531 in FIG. 5) has a designated value.

In an embodiment, the sensor value obtained through the magnetic sensor 531 when the electronic device 501 is in a folded state (e.g., the state in FIGS. 3A and 3B) may be a first value (e.g., "0"). When the electronic device 501 is in an unfolded state (e.g., the state in FIGS. 2A and 2B), the sensor value obtained through the magnetic sensor 531 may be a second value (e.g., "1").

In an embodiment, when the electronic device 501 is changed from a folded state to an unfolded state, the sensor value obtained through the magnetic sensor 531 may be changed from a first value (e.g., "0") to a second value (e.g., "1"). When the electronic device 501 is changed from an unfolded state to a folded state, the sensor value obtained through the magnetic sensor 531 may be changed from a second value (e.g., "1") to a first value (e.g., "0").

In an embodiment, a designated value may be a first value (e.g., "0"), and the processor 550 may identify whether the sensor value obtained through the magnetic sensor 531 has a first value (e.g., "0"). When the sensor value obtained through the magnetic sensor 531 has a first value (e.g., "0") (e.g., YES at operation 710), the processor 550 may identify, at operation 720, whether a value of an angle between the first housing (e.g., first housing 210 in FIGS. 2A and 2B) and the second housing (e.g., second housing 220 in FIGS. 2A and 2B) is a designated angle. The designated angle may refer to about zero degrees.

In an embodiment, when the value of the angle between the first housing 210 and the second housing 220 is a designated angle (e.g., about zero degrees) (e.g., YES at operation 720), the processor 550 may, at operation 730, determine the electronic device 501 to be in a folded state. When the value of the angle between the first housing 210 and the second housing 220 is not a designated angle (e.g., about zero degrees) (e.g., NO at operation 720), the processor 550 may, at operation 740, determine the electronic device 501 to be in an unfolded state.

In an embodiment, when the sensor value obtained through the magnetic sensor 531 does not have a designated value (e.g., "0") (e.g., NO at operation 710), the processor 550 may determine the electronic device 501 to be in an unfolded state at operation 740.

In FIG. 7, according to various embodiments, by further identifying whether the value of the angle between the first housing 210 and the second housing 220 exceeds a designated angle (e.g., about zero degrees) in addition to the sensor value obtained through the magnetic sensor 531 to determine the state of the electronic device 501 (e.g., folded state or unfolded state), the accuracy of the operation to determine the folding state (and/or switch of the folding state) of the electronic device 501 may increase.

Figure 8:
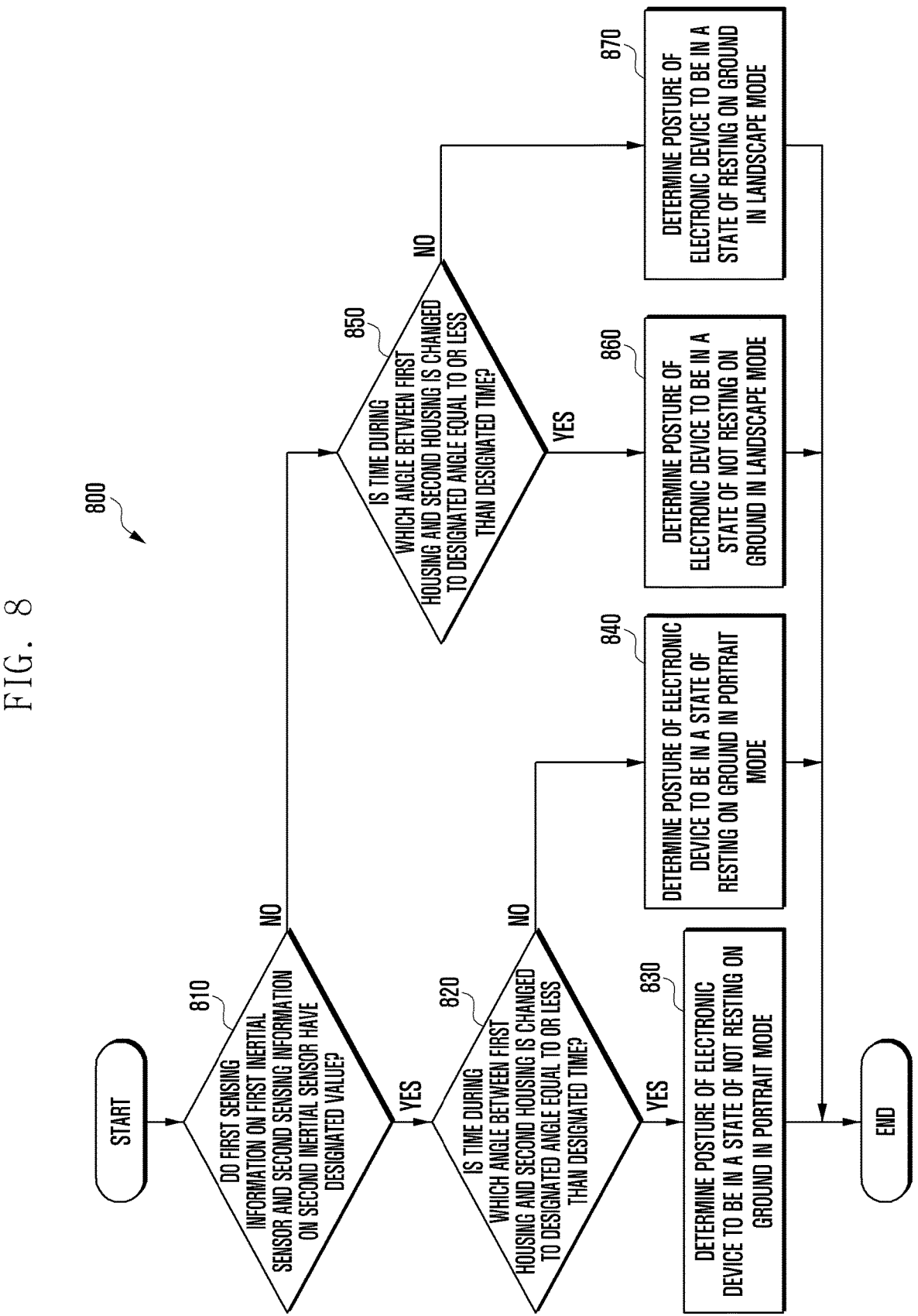
FIG. 8 is a flowchart illustrating an example method of determining a posture of an electronic device, according to various embodiments.

FIG. 8 is a flowchart 800 illustrating an example method of determining a posture of the electronic device 501, according to various embodiments.

In embodiments below, each operation may be performed sequentially, but is not required to be performed sequentially. For example, the order of each operation may be changed, and at least two operations may be performed in parallel.

According to an embodiment, it may be understood that operations 810 to 870 may be performed on the processor (e.g., processor 550 in FIG. 5) of the electronic device (e.g., electronic device 501 in FIG. 5).

FIG. 8 may correspond to operation 620 in FIG. 6 described above, according to various embodiments.

With reference to FIG. 8, the processor 550 of the electronic device 501 may, at operation 810, identify whether the first sensing information on the first inertial sensor (e.g., first inertial sensor 533 in FIG. 5) and the second sensing information on the second inertial sensor (e.g., second inertial sensor 535 in FIG. 5) have a designated value.

In an embodiment, the first inertial sensor 533 may be included in the first housing of the electronic device 501 (e.g., first housing 210 in FIGS. 2A and 2B), and the second inertial sensor 535 may be included in the second housing of the electronic device 501 (e.g., second housing 220 in FIGS. 2A and 2B).

In an embodiment, the first sensing information on the first inertial sensor 533 may include the first sensing information on the first inertial sensor 533 measured on a specific axis, e.g., the x-axis. The second sensing information on the second inertial sensor 535 may be the second sensing information on the second inertial sensor 535 measured on a specific axis, e.g., the x-axis.

In an embodiment, the designated value may be about ±1 g (e.g., about ±9.8 m/s$^2$).

In an embodiment, the processor 550 may obtain (or measure) sensing information (e.g., a sensor value) of a specific axis, e.g., the x-axis, through each of the first inertial sensor 533 and the second inertial sensor 535, when the electronic device 501 is in a folded state (e.g., the state in FIGS. 3A and 3B). The processor 550 may identify whether the sensing information (e.g., a sensor value) on the first inertial sensor 533 obtained (or measured) on the x-axis has a designated value, e.g., about 1 g (e.g., about 9.8 m/s$^2$), and whether the sensing information (e.g., a sensor value) on the second inertial sensor 535 obtained (or measured) on the x-axis has a designated value, e.g., about −1 g (e.g., about −9.8 m/s$^2$).

In an embodiment, when the first sensing information on the first inertial sensor 533 and the second sensing information on the second inertial sensor 535 has a designated value (e.g., about ±1 g (e.g., about ±9.8 m/s$^2$)) (e.g., YES at operation 810), the processor 550 may identify, at operation 820, whether the time during which the angle between the first housing 210 and the second housing 220 is changed to a designated angle is equal to or less than a designated time.

In an embodiment, the designated angle may be about 180 degrees, and the designated time may be about 1.5 seconds. However, the present disclosure is not limited thereto.

In an embodiment, when the time during which the angle between the first housing 210 and the second housing 220 is changed to a designated angle (e.g., about 180 degrees) is equal to or less than a designated time (e.g., about 1.5 seconds) (e.g., YES at operation 820), the processor 550 may, at operation 830, determine the posture of the electronic device 501 to be in a state of not resting on the ground in a portrait mode.

In an embodiment, when the time during which the angle between the first housing 210 and the second housing 220 is changed to a designated angle (e.g., about 180 degrees) is not equal to or less than a designated time (e.g., exceeds a designated time) (e.g., NO at operation 820), the processor 550 may determine, at operation 840, that the posture of the electronic device 501 is in a state of resting on the ground in a portrait mode.

In an embodiment, when the first sensing information on the first inertial sensor 533 and the second sensing information on the second inertial sensor 535 do not have a designated value (e.g., about ±1 g (e.g., about ±9.8 m/s$^2$)) (e.g., NO at operation 810), the processor 550 may identify whether, at operation 850, the time during which the angle between the first housing 210 and the second housing 220 is changed to a designated angle (e.g., about 180 degrees) is equal to or less than a designated time (e.g., about 1.5 seconds).

In an embodiment, when the time during which the angle between the first housing 210 and the second housing 220 is changed to a designated angle (e.g., about 180 degrees) is equal to or less than a designated time (e.g., about 1.5 seconds) (e.g., YES at operation 850), the processor 550 may, at operation 860, determine the posture of the electronic device 501 to be in a state of not resting on the ground in a landscape mode.

In an embodiment, when the time during which the angle between the first housing 210 and the second housing 220 is changed to a designated angle (e.g., about 180 degrees) is not equal to or less than a designated time (e.g., about 1.5 seconds) (e.g., NO at operation 850), the processor 550 may determine, at operation 870, that the posture of the electronic device 501 is in a state of resting on the ground in a landscape mode.

In various embodiments, the processor 550 may set the direction of the screen into a display mode corresponding to the posture of the electronic device 501 determined according to the operations described above, and display the screen in the set display mode on the first display (e.g., first display 541 in FIG. 5).

Figure 9:
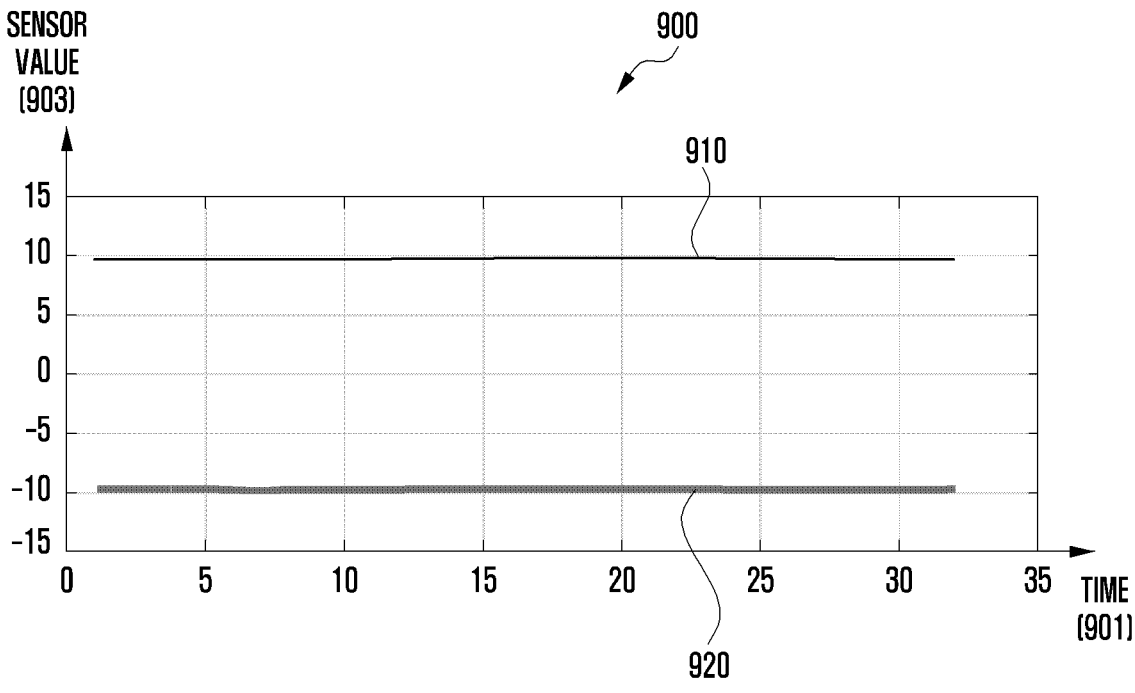
FIG. 9 is a graph indicating when first sensing information on a first inertial sensor and second sensing information on a second inertial sensor have a designated value, according to various embodiments.

FIG. 9 is a graph 900 indicating when first sensing information on the first inertial sensor 533 and second sensing information on the second inertial sensor 535 have a designated value, according to various embodiments.

With reference to FIG. 9, in the graph according to FIG. 9, the x-axis may indicate a time 901 and the y-axis may indicate a sensor value 903 of an inertial sensor (e.g., first inertial sensor 533, second inertial sensor 535 in FIG. 5).

In an embodiment, graph <910> shows a sensor value of the first inertial sensor 533 measured on a specific axis, e.g., the x-axis, when the posture of the electronic device (e.g., electronic device 501 in FIG. 5) is in a portrait mode. For example, the first inertial sensor 533 may be included in the first housing (e.g., first housing 210 in FIGS. 2A and 2B) of the electronic device 501.

In an embodiment, graph <920> shows a sensor value of the second inertial sensor 535 measured on a specific axis, e.g., the x-axis, when the posture of the electronic device 501 is in a portrait mode. For example, the second inertial sensor 535 may be included in the second housing (e.g., second housing 220 in FIGS. 2A and 2B) of the electronic device 501.

In an embodiment, the processor (e.g., processor 550 in FIG. 5) may identify (or determine) the posture of the electronic device 501 as being in a portrait mode when the sensor value measured on the x-axis through the first inertial sensor 533 has a value of about 1 g (e.g., about 9.8 m/s$^2$) and the sensor value measured on the x-axis through the second inertial sensor 535 has a value of about −1 g (e.g., about −9.8 m/s$^2$).

Figure 10A:
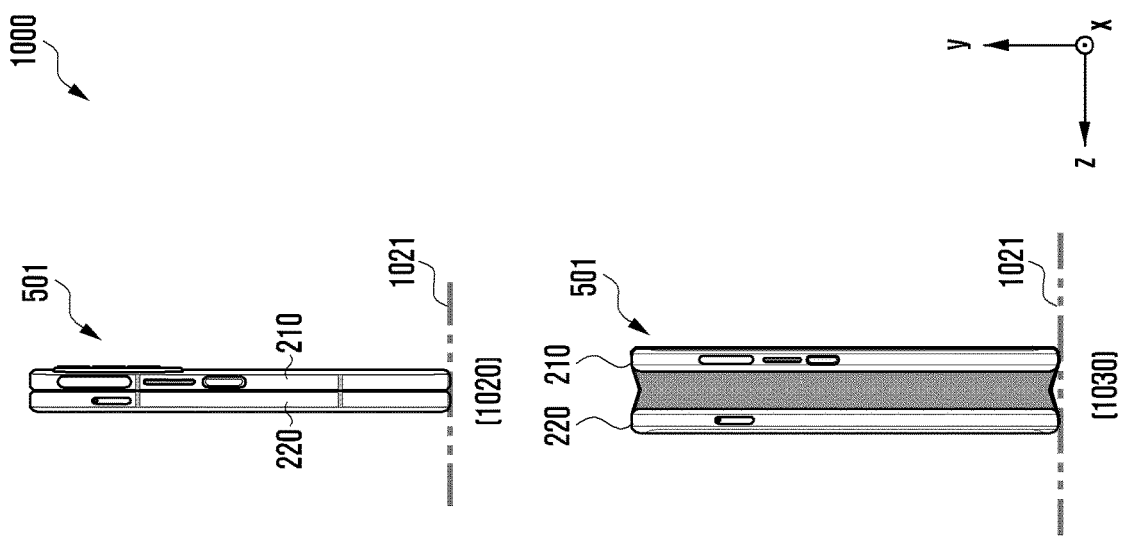
FIG. 10A is a diagram illustrating an example method of detecting an electronic device being switched from a portrait mode and a folded state to an unfolded state, according to various embodiments.
Figure 10A:
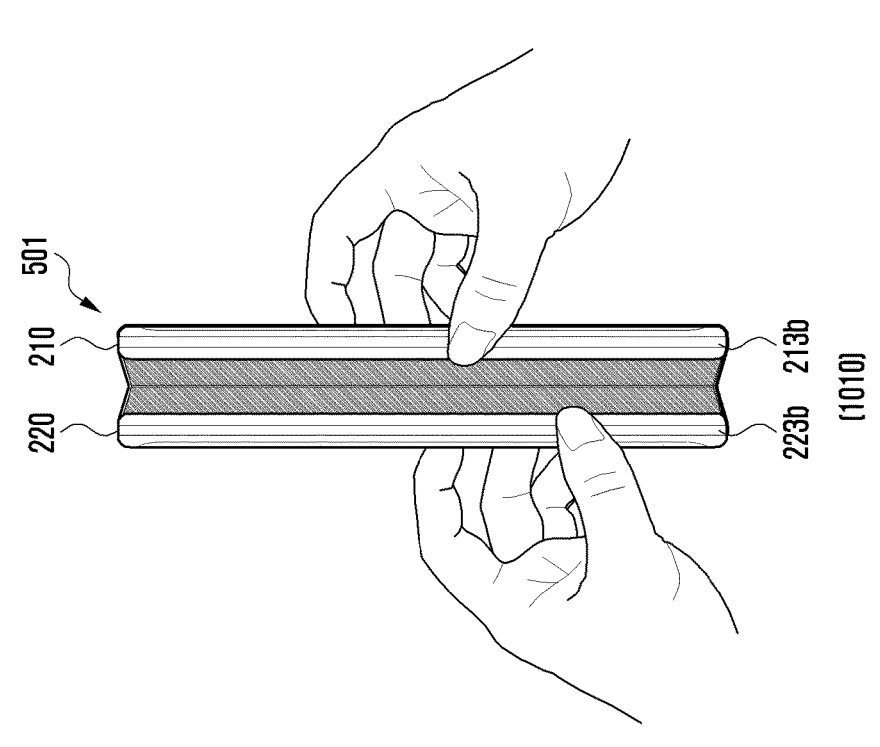

FIG. 10A is a diagram 1000 illustrating an example method of detecting the electronic device 501 being switched from a portrait mode and a folded state to an unfolded state, according to various embodiments.

With reference to FIG. 10A, reference numeral <1010> may be a view illustrating a switch from a folded state to an unfolded state, in which the posture of the electronic device (e.g., electronic device 501 in FIG. 5) is in a state of not resting on a ground 1021 in a portrait mode. For example, a folded state in a state in which the posture of the electronic device 501 is in a portrait mode and not resting on the ground 1021 may refer to a folded state in a state in which the third side surface of the electronic device 501 (e.g., third side surface 213b of the first housing 210, third side surface 223b of the second housing 220) faces the ground 1021 but is not resting on the ground 1021.

In an embodiment, reference numeral <1020> may be a view illustrating the posture of the electronic device 501 being in a state of resting on the ground 1021 in a portrait mode, and in a folded state. Reference numeral <1030> may be a view illustrating a switch from a state of reference numeral <1020> to an unfolded state. For example, a folded state in which the posture of the electronic device 501 is in a portrait mode and in a state of resting on the ground 1021 may refer to a folded state in which the second side surface of the electronic device 501 (e.g., second side surface 213b of the first housing 210, second side surface 223b of the second housing 220) is in a state of resting while facing the ground 1021.

In FIG. 10A, according to various embodiments, the processor 550 may, when the electronic device 501 is switched to an unfolded state, set the direction of the screen into a display mode (e.g., a portrait mode) corresponding to the determined posture of the electronic device 501 (e.g., a state in which the electronic device 501 is not resting on the ground 1021 in a portrait mode according to reference numeral <1010>, a state in which the electronic device 501 is resting on the ground 1021 in a portrait mode according to reference numeral <1020>), and may display the screen in the set display mode (e.g., a portrait mode) on the first display (e.g., first display 541 in FIG. 5).

Figure 10B:
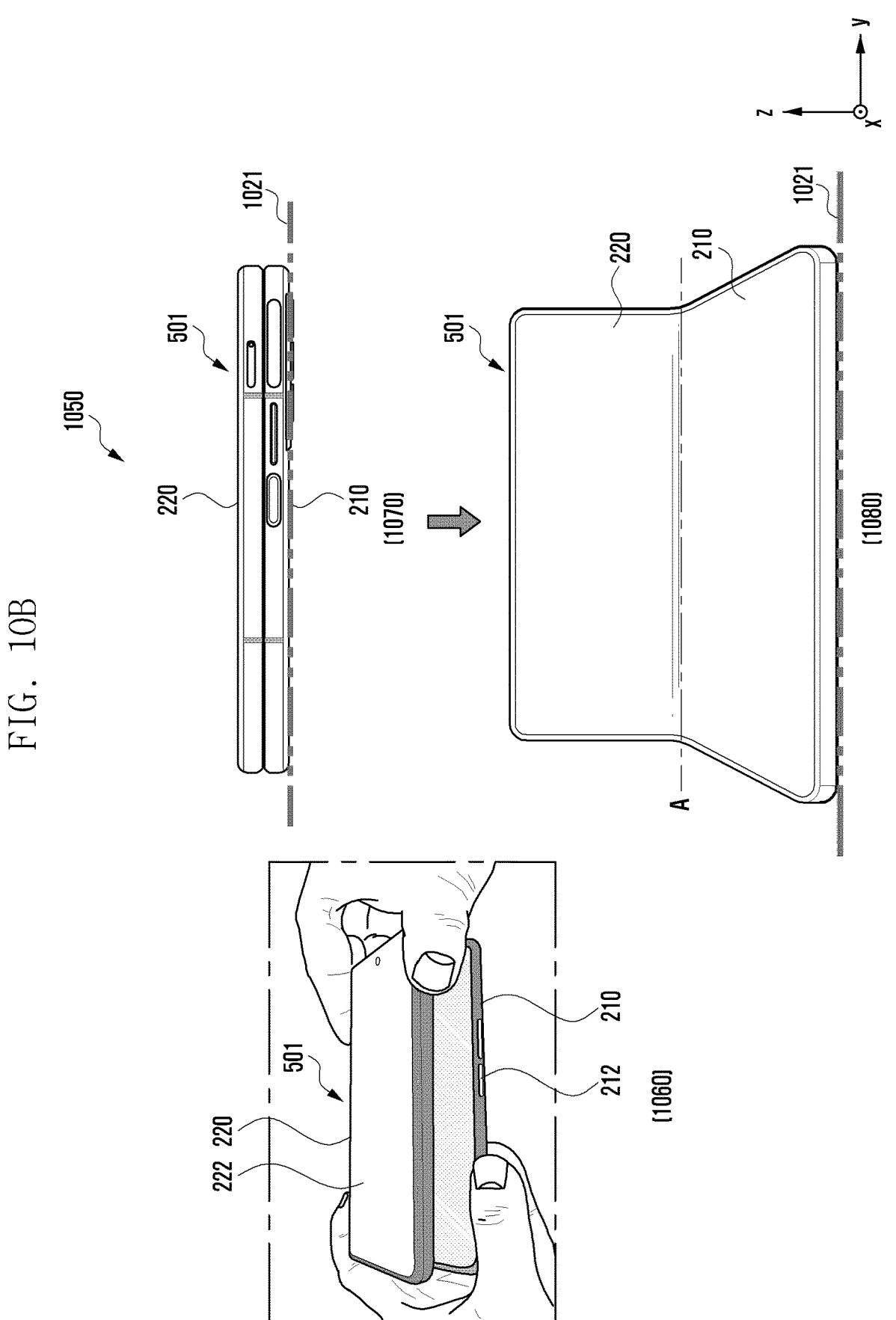
FIG. 10B is a diagram illustrating an example method of detecting an electronic device being switched from a landscape mode and a folded state to an unfolded state, according to various embodiments.

FIG. 10B is a diagram 1050 illustrating an example method of detecting the electronic device 501 being switched from a landscape mode and a folded state to an unfolded state, according to various embodiments.

With reference to FIG. 10B, reference numeral <1060> may be a view illustrating a switch from a folded state to an unfolded state, in which the posture of the electronic device (e.g., electronic device 501 in FIG. 5) is in a state of not resting on a ground 1021 in a landscape mode. For example, a folded state in which the posture of the electronic device 501 is in a landscape mode and in a state of not resting on the ground 1021 may be a state in which the second surface 212 of the first housing 210 of the electronic device 501 faces the ground 1021 but is not resting on the ground 1021. For another example, a folded state in which the posture of the electronic device 501 is in a landscape mode and in a state of not resting on the ground 1021 may be a state in which the fourth surface 222 of the second housing 220 of the electronic device 501 faces in a direction opposite to a direction in which the fourth surface 222 of the second housing 220 of the electronic device 501 faces the ground 1021.

In an embodiment, reference numeral <1070> may be a view illustrating the posture of the electronic device 501 being in a state of resting on the ground 1021 in a landscape mode, and in a folded state. Reference numeral <1080> may be a view illustrating a switch from a state of reference numeral <1070> to an unfolded state. For example, a folded state in which the posture of the electronic device 501 is in a landscape mode and in a state of resting on the ground 1021 may refer to a folded state in which the second surface 212 of the first housing 210 of the electronic device 501 is in a state of resting while facing the ground 1021.

In FIG. 10B, according to various embodiments, the processor 550 may, when the electronic device 501 is switched to an unfolded state, set the direction of the screen into a display mode (e.g., a landscape mode) corresponding to the determined posture of the electronic device 501 (e.g., a state in which the electronic device 501 is not resting on the ground 1021 in a landscape mode according to reference numeral <1060>, a state in which the electronic device 501 is resting on the ground 1021 in a landscape mode according to reference numeral <1070>), and may display the screen in the set display mode (e.g., a landscape mode) on the first display (e.g., first display 541 in FIG. 5).

Figure 11:
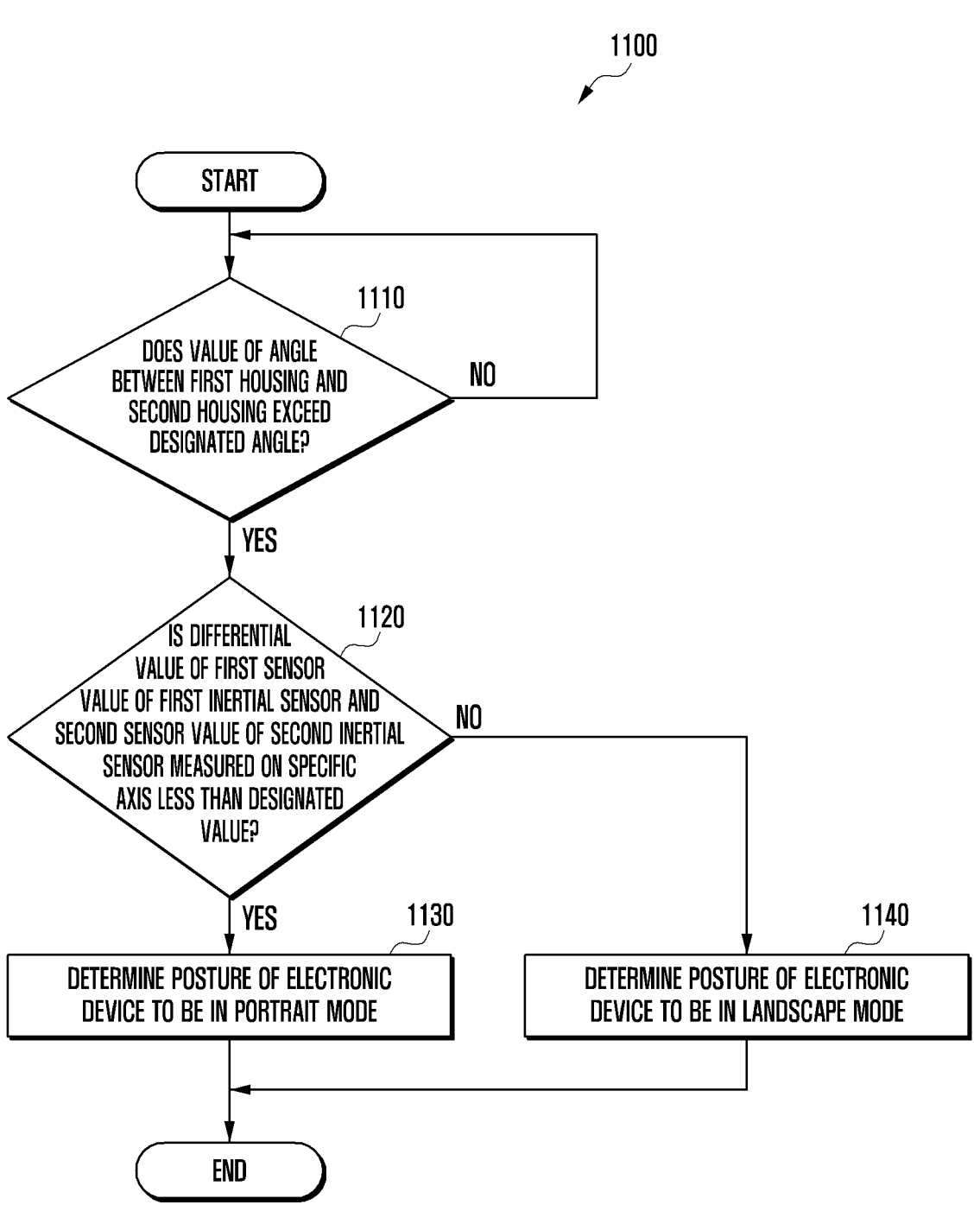
FIG. 11 is a flowchart illustrating an example method of determining a posture of an electronic device, according to various embodiments.

FIG. 11 is a flowchart 1100 illustrating an example method of determining a posture of the electronic device 501, according to various embodiments.

FIG. 11 may correspond to operation 620 in FIG. 6 described above, according to various embodiments.

In embodiments below, each operation may be performed sequentially, but is not required to be performed sequentially. For example, the order of each operation may be changed, and at least two operations may be performed in parallel.

According to an embodiment, it may be understood that operations 1110 to 1140 may be performed on the processor (e.g., processor 550 in FIG. 5) of the electronic device (e.g., electronic device 501 in FIG. 5).

With reference to FIG. 11, the processor 550 of the electronic device 501 may identify, at operation 1110, whether the value of the angle between the first housing (e.g., first housing 210 in FIGS. 2A and 2B) and the second housing (e.g., second housing 220 in FIGS. 2A and 2B) exceeds a designated angle (e.g., about zero degrees).

In an embodiment, when the value of the angle between the first housing 210 and the second housing 220 does not exceed a designated angle (e.g., about zero degrees) (e.g., NO at operation 1110), the processor 550 may perform operation 1110 repeatedly.

In an embodiment, when the value of the angle between the first housing 210 and the second housing 220 exceeds a designated angle (e.g., about zero degrees) (e.g., YES at operation 1110), the processor 550 may, at operation 1120, identify whether a differential value of a first sensor value of the first inertial sensor (e.g., first inertial sensor 533 in FIG. 5) and a second sensor value of the second inertial sensor (e.g., second inertial sensor 535 in FIG. 5) measured on a specific axis (e.g., x-axis and/or z-axis) is less than a designated value (e.g., "4").

In an embodiment, when the differential value of the first sensor value of the first inertial sensor 533 and the second sensor value of the second inertial sensor 535 measured on a specific axis (e.g., x-axis and/or z-axis) is less than a designated value (e.g., "4") (e.g., YES at operation 1120), the processor 550 may determine, at operation 1130, that the posture of the electronic device 501 is in a portrait mode.

In an embodiment, when the differential value of the first sensor value of the first inertial sensor 533 and the second sensor value of the second inertial sensor 535 measured on a specific axis (e.g., x-axis and/or z-axis) is not less than a designated value (e.g., equal to or greater than a designated value) (e.g., NO at operation 1120), the processor 550 may determine, at operation 1140, that the posture of the electronic device 501 is in a landscape mode.

Figure 12A:
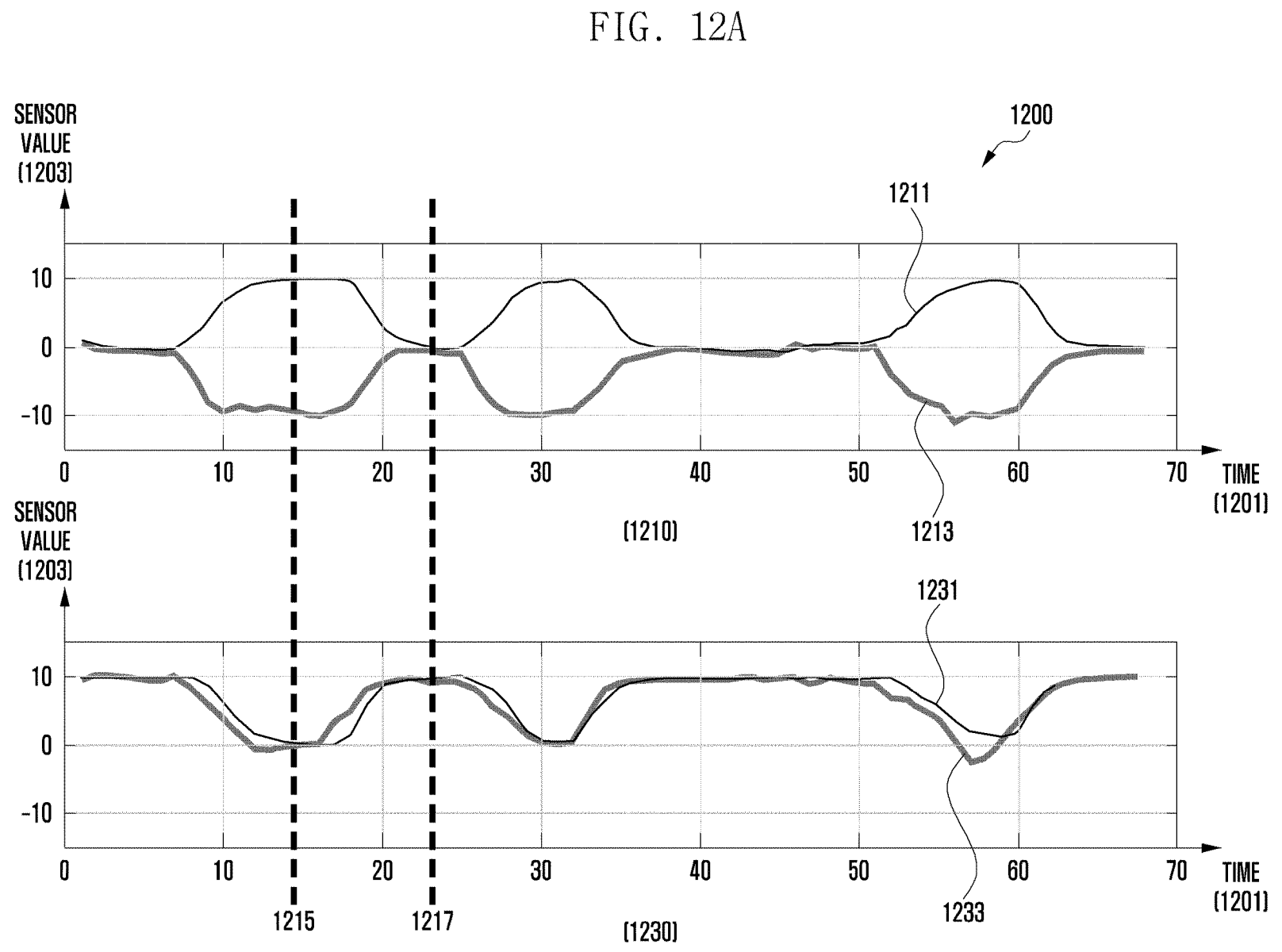

FIG. 12A is includes graphs 1200 indicating sensor values of the first inertial sensor 533 and the second inertial sensor 535 measured on a specific axis when a folding state of the electronic device 501 being switched in a portrait mode (e.g., from a folded state to an unfolded state or from an unfolded state to a folded state) is detected, according to various embodiments.

With reference to FIG. 12A, in the graph according to reference numerals <1210> and <1230>, the x-axis may indicate a time 1201 and the y-axis may indicate sensor values 1203 of inertial sensors (e.g., a first inertial sensor (e.g., first inertial sensor 533 in FIG. 5), a second inertial sensor (e.g., second inertial sensor 535 in FIG. 5)). For example, the first inertial sensor 533 may be included in the first housing of the electronic device 501 (e.g., first housing 210 in FIGS. 2A and 2B), and the second inertial sensor 535 may be included in the second housing of the electronic device 501 (e.g., second housing 220 in FIGS. 2A and 2B).

In an embodiment, reference numeral <1210> illustrates a graph 1211 showing a sensor value of the first inertial sensor 533 and a graph 1213 showing a sensor value of the second inertial sensor 535 when the posture of the electronic device (e.g., electronic device 501 in FIG. 5) is in a portrait mode. For example, the graphs 1211 and 1213 illustrate sensor values on a specific axis, e.g., the x-axis, which are measured (e.g., detected or obtained) through the first inertial sensor 533 and the second inertial sensor 535.

In an embodiment, the processor (e.g., processor 550 in FIG. 5) may detect a change in the sensor value of the x-axis measured through the first inertial sensor 533 and a change in the sensor value of the x-axis measured through the second inertial sensor 535 during a period from a first time 1215 to a second time 1217. For example, when the electronic device 501 undergoes a change from a state in which the sensor value of the x-axis measured through the first inertial sensor 533 has a value of "about 10" and the sensor value of the x-axis measured through the second inertial sensor 535 has a value of "about –10" at the first time 1215, to a state in which the sensor value of the x-axis measured through the first inertial sensor 533 has a sensor value of "about 0" and the sensor value of the x-axis measured through the second inertial sensor 535 has a sensor value of "about 0" at the second time 1217, the processor 550 may identify that the electronic device 501 is switched from a folded state (e.g., the state in FIGS. 3A and 3B) to an unfolded state (e.g., the state in FIGS. 2A and 2B) in a portrait mode.

For example, a user may change the electronic device 501 from being in a portrait mode and a folded state to an unfolded state through an operation of unfolding each of the first housing 210 and the second housing 220 in a specific direction (e.g., unfolding the first housing 210 in the x-axis direction and the second housing 220 in the –x-axis direction). In this case, the first housing 210 and the second housing 220 may simultaneously be unfolded in the x-axis direction and the –x-axis direction at similar rates. Accordingly, the sensor value of the x-axis measured through the first inertial sensor 533 may change from a state having a value of "about 10" (e.g., a folded state) to a state having a value of "about 0" (e.g., an unfolded state). In addition, the sensor value of the x-axis measured through the second inertial sensor 535 may change from a state having a value of "about –10" (e.g., a folded state) to a state having a value of "about 0" (e.g., an unfolded state). The processor 550 may identify that the electronic device 501 is switched from a folded state to an unfolded state in a portrait mode on the basis of a change in the sensor value of each of the first inertial sensor 533 and the second inertial sensor 535 measured on the x-axis.

In an embodiment, reference numeral <1230> illustrates a graph 1231 showing a sensor value of the first inertial sensor 533 and a graph 1233 showing a sensor value of the second inertial sensor 535 when the posture of the electronic device 501 is in a portrait mode. For example, the graphs 1231 and 1233 illustrate sensor values on a specific axis, e.g., the z-axis, which are measured (e.g., detected or obtained) through the first inertial sensor 533 and the second inertial sensor 535.

In an embodiment, the processor 550 may detect a change in the sensor value of the z-axis measured through the first inertial sensor 533 and the sensor value of the z-axis measured through the second inertial sensor 535 during a period from the first time 1215 to the second time 1217. For example, the processor 550 may identify that the electronic device 501 is switched from a folded state to an unfolded state in a portrait mode when the sensor value of the z-axis measured through each of the first inertial sensor 533 and the second inertial sensor 535 changes from a state having a value of "about 0" at the first time 1215 to a state having a sensor value of "about 10" at the second time 1217.

For example, the user may change the electronic device 501 into an unfolded state through an operation of unfolding each of the first housing 210 and the second housing 220 in a specific direction (e.g., unfolding the first housing 210 in the x-axis direction and the second housing 220 in the –x-axis direction) in a state in which the direction information on the electronic device 501 is in a portrait mode and a folded state. In this case, the first housing 210 and the second housing 220 may simultaneously be unfolded in the x-axis direction and the –x-axis direction at similar rates. The processor 550 may, on the basis of each of the first housing 210 and the second housing 220 being unfolded in a specific direction, determine that a folding state of the electronic device 501 is changed when the direction information on the electronic device 501 is in a portrait mode. Accordingly, the sensor value of the z-axis measured through each of the first inertial sensor 533 and the second inertial sensor 535 may change from a state having a value of "about 0" (e.g., a folded state) to a state having a value of "about 10" (e.g., an unfolded state). On the basis of this, the processor 550 may identify that the electronic device 501 is switched from a folded state to an unfolded state in a portrait mode.

Figure 12B:
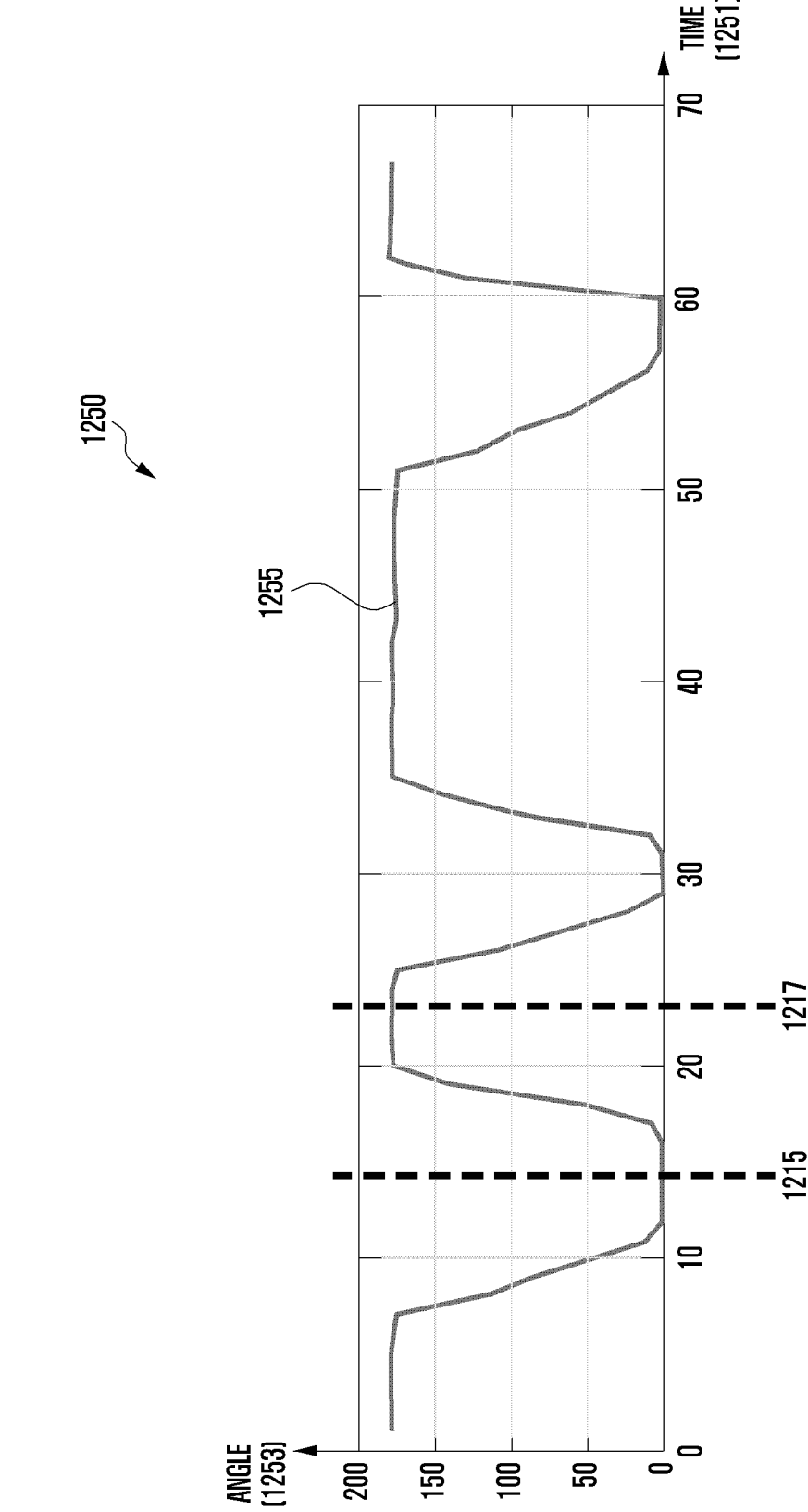
FIG. 12B is a graph indicating a value of an angle between a first housing and a second housing when a folding state of an electronic device being switched in a portrait mode (e.g., from a folded state to an unfolded state or from an unfolded state to a folded state) is detected, according to various embodiments.

FIG. 12B is a graph 1250 indicating a value of an angle between the first housing 210 and the second housing 220 when a folding state of the electronic device 501 being switched in a portrait mode (e.g., from a folded state to an unfolded state or from an unfolded state to a folded state) is detected, according to various embodiments.

With reference to FIG. 12B, in a graph according to FIG. 12B, the x-axis may indicate a time 1251 and the y-axis may indicate an angle 1253 between the first housing (e.g., first housing 210 in FIGS. 2A and 2B) and the second housing (e.g., second housing 220 in FIGS. 2A and 2B).

As illustrated in FIG. 12A above, according to various embodiments, the processor (e.g., processor 550 in FIG. 5) may identify that the electronic device (e.g., electronic device 501 in FIG. 5) has been switched from a folded state (e.g., the state in FIGS. 3A and 3B) to an unfolded state (e.g., the state in FIGS. 2A and 2B) on the basis of a change in sensor values of the inertial sensors (e.g., first inertial sensor 533 and second inertial sensor 535) measured during a period from the first time 1215 to the second time 1217. In this case, the value of the angle between the first housing 210 and the second housing 220 at the first time 1215 may have a value of about zero degrees, and the value of the angle between the first housing 210 and the second housing 220 at the second time 1217 may have a value of about 180 degrees, as shown in a graph 1255. The processor 550 may identify that the electronic device 501 is switched from a folded state to an unfolded state when the direction information on the electronic device 501 is in a portrait mode, on the basis of the value of the angle between the first housing 210 and the second housing 220 being converted from about zero degrees to about 180 degrees.

In FIG. 12A and FIG. 12B, according to various embodiments, the processor 550 may, when the electronic device 501 is switched to an unfolded state, identify the posture of the electronic device 501, e.g., that the electronic device 501 is in a portrait mode, on the basis of a change in the sensor value of the first inertial sensor 533, a change in the sensor value of the second inertial sensor 535, and/or a change in the value of the angle between the first housing 210 and the second housing 220. The processor 550 may set the direction of the screen into a display mode (e.g., portrait mode) corresponding to the posture (e.g., portrait mode) of the identified electronic device 501, and display the screen in the set display mode (e.g., portrait mode) on the first display (e.g., first display 541 in FIG. 5).

Figure 12C:
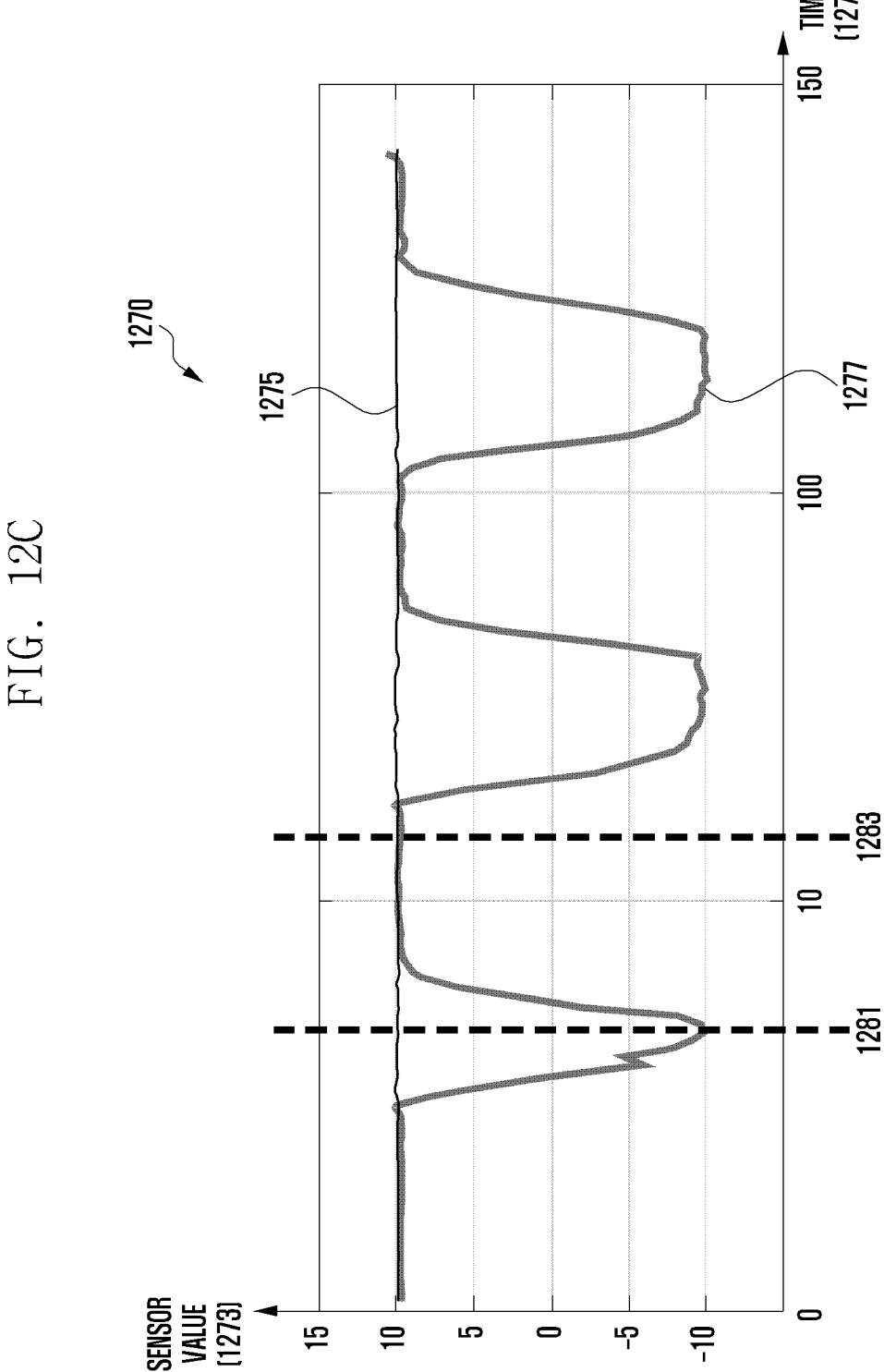
FIG. 12C is a graph indicating sensor values of a first inertial sensor and a second inertial sensor measured on a specific axis when a folding state of an electronic device being switched in a landscape mode and in a state of resting on a ground (e.g., from a folded state to an unfolded state or from an unfolded state to a folded state) is detected, according to various embodiments.

FIG. 12C is a graph 1270 indicating sensor values of the first inertial sensor 533 and the second inertial sensor 535 measured on a specific axis when a folding state of the electronic device 501 being switched in a state in which the electronic device 501 is in a landscape mode and in a state of resting on the ground (e.g., from a folded state to an unfolded state or from an unfolded state to a folded state) is detected, according to various embodiments.

With reference to FIG. 12C, in the graph according to FIG. 12C, the x-axis may indicate a time 1271 and the y-axis may indicate sensor values 1273 of inertial sensors (e.g., a first inertial sensor (e.g., first inertial sensor 533 in FIG. 5), a second inertial sensor (e.g., second inertial sensor 535 in FIG. 5)). For example, the first inertial sensor 533 may be included in the first housing of the electronic device 501 (e.g., first housing 210 in FIGS. 2A and 2B), and the second inertial sensor 535 may be included in the second housing of the electronic device 501 (e.g., second housing 220 in FIGS. 2A and 2B).

In an embodiment, FIG. 12c illustrates a graph 1275 showing a sensor value of the first inertial sensor 533 and a graph 1277 showing a sensor value of the second inertial sensor 535, in a state in which the posture of the electronic device (e.g., electronic device 501 in FIG. 5) is in a landscape mode and resting on the ground. For example, the graphs 1275 and 1277 illustrate sensor values on a specific axis, e.g., the z-axis, which are measured (e.g., detected or obtained) through the first inertial sensor 533 and the second inertial sensor 535.

In an embodiment, the processor (e.g., processor 550 in FIG. 5) may detect a change in the sensor value of the z-axis measured through the first inertial sensor 533 and a change in the sensor value of the z-axis measured through the second inertial sensor 535 during a period from a first time 1281 to a second time 1283. For example, the processor 550 may identify that the sensor value of the z-axis measured through the first inertial sensor 533 at the first time 1281 has a value of "about 10" and remains in a state in which the sensor value of the z-axis measured through the first inertial sensor 533 at the second time 1283 has a value of "about 10". In addition, the processor 550 may identify a change in the sensor value of the z-axis measured through the second inertial sensor 535 at the first time 1281 from a state having a value of "about −10" to a state having a value of "about 10" as measured through the second inertial sensor 535 at the second time 1283. When the processor 550 identifies that the sensor value of the z-axis measured through the first inertial sensor 533 remains at "about 10" during a period from the first time 1281 to the second time 1283, and the sensor value of the z-axis measured through the second inertial sensor 535 changes from a state having a value of "about −10" to a state having a value of "about 10", the processor 550 may identify that the electronic device 501 is in a landscape mode and resting on the ground, and is switched from a folded state (e.g., the state in FIGS. 3A and 3B) to an unfolded state (e.g., the state in FIGS. 2A and 2B).

For example, when the electronic device 501 is in a landscape mode, a state of resting on the ground, and a folded state, e.g., when the first housing 210 is resting on the ground, the user may change the electronic device 501 to an unfolded state through an operation of unfolding the second housing 220 in a specific direction (e.g., unfolding the second housing 220 in the z-axis direction). In this case, the first housing 210 is in a state of not moving, and only the second housing 220 may be unfolded in the z-axis direction. Accordingly, the sensor value of the z-axis measured through the first inertial sensor 533 may remain in a state having "about 10", and the sensor value of the z-axis measured through the second inertial sensor 535 may change from a state having "about −10" to a state having "about 10". On the basis of this, the processor 550 may identify that the direction information on the electronic device 501 is in a landscape mode and in a state of resting on the ground, and that the electronic device 501 is switched from a folded state to an unfolded state.

In FIGS. 12A, 12B and 12C (which may be referred to as FIGS. 12A to 12C), according to various embodiments, the electronic device 501 may accurately identify a switch in the posture and folding state of the electronic device 501 on the basis of a change in the sensor value of the first inertial sensor 533, a change in the sensor value of the second inertial sensor 535, and/or a change in the value of the angle between the first housing 210 and the second housing 220 measured on a specific axis, e.g., the x-axis and/or the z-axis, during a designated time period. Accordingly, the electronic device 501 may display the screen in a display mode according to a switch of the posture and folding state of the electronic device 501.

In FIG. 12C, according to various embodiments, the processor 550 may identify the posture of the electronic device 501, e.g., that the electronic device 501 is in a landscape mode, on the basis of a change in the sensor value of the first inertial sensor 533 and/or a change in the sensor value of the second inertial sensor 535, when the electronic device 501 is switched to an unfolded state. The processor 550 may set the direction of the screen into a display mode (e.g., landscape mode) corresponding to the posture (e.g., landscape mode) of the identified electronic device 501, and display the screen in the set display mode (e.g., landscape mode) on the first display (e.g., first display 541 in FIG. 5).

Figure 13:
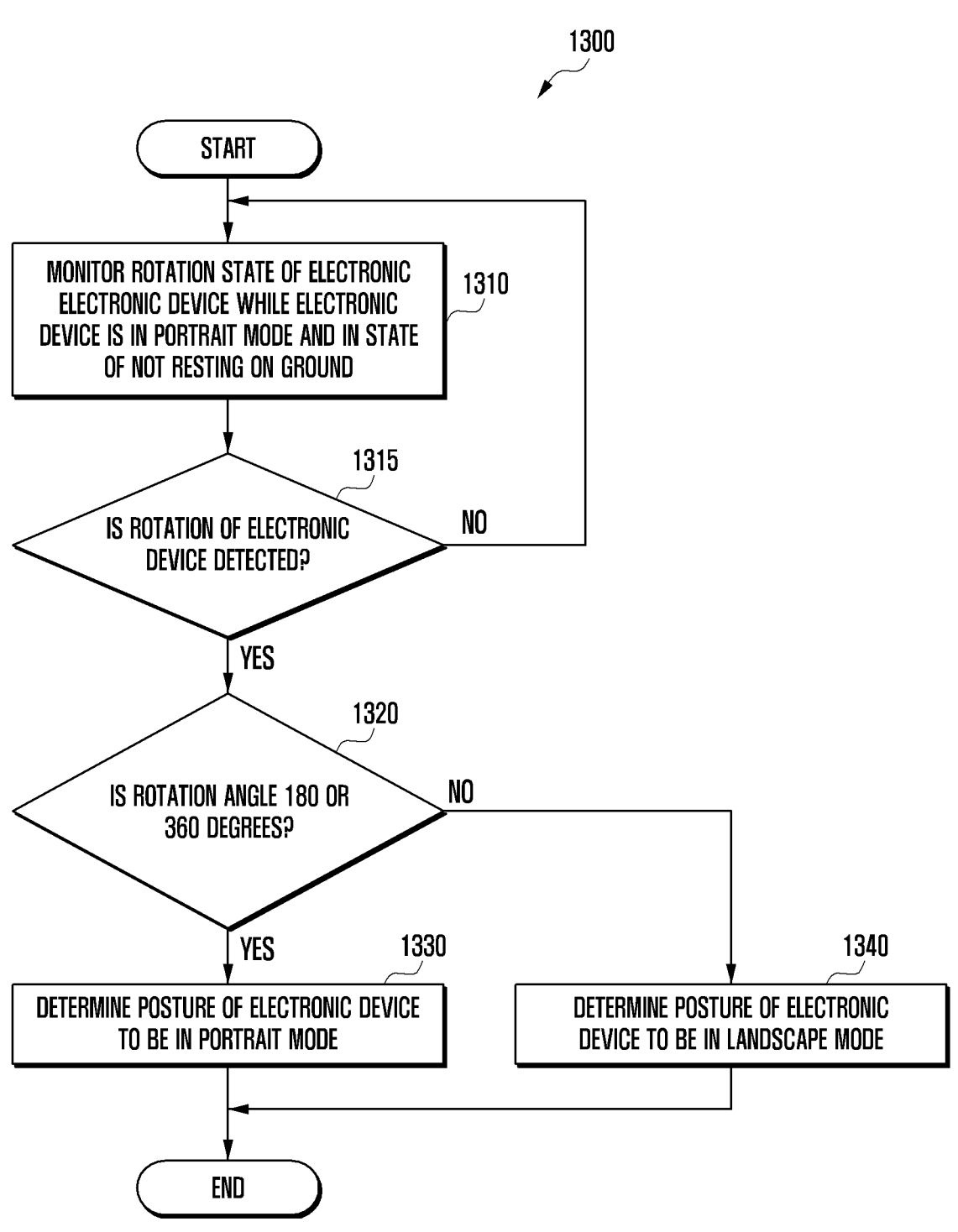
FIG. 13 is a flowchart illustrating an example method of determining a posture of an electronic device, according to various embodiments.

FIG. 13 is a flowchart 1300 illustrating an example method of determining a posture of the electronic device 501, according to various embodiments.

In embodiments below, each operation may be performed sequentially, but is not required to be performed sequentially. For example, the order of each operation may be changed, and at least two operations may be performed in parallel.

According to an embodiment, it may be understood that operations 1310 to 1340 may be performed on the processor (e.g., processor 550 in FIG. 5) of the electronic device (e.g., electronic device 501 in FIG. 5).

FIG. 13 may correspond to operation 620 in FIG. 6 described above, according to various embodiments.

With reference to FIG. 13, the processor 550 of the electronic device 501 may, at operation 1310, monitor a rotation state of the electronic device 501 while the electronic device 501 is in a portrait mode and in a state of not resting on the ground. The processor 550 may monitor the rotation state of the electronic device 501 through gyro integration of a specific axis of the electronic device 501, e.g., gyro integration of the x-axis, while the electronic device 501 is in a portrait mode and in a state of not resting on the ground. For example, the processor 550 may monitor the rotation state of the electronic device 501 through an integration over an angular velocity signal on the x-axis.

In an embodiment, at operation 1315, the processor 550 may, at operation 1315, identify whether a rotation of the electronic device 501 is detected on the basis of a result of the monitoring. When no rotation of the electronic device 501 is detected (e.g., NO at operation 1315), the processor 550 may perform operation 1310 repeatedly.

In an embodiment, when the rotation of the electronic device 501 is detected (e.g., YES at operation 1315), the processor 550 may identify, at operation 1320, whether a rotation angle is about 180 degrees or about 360 degrees. For example, the processor 550 may calculate a roll angle of the electronic device 501 corresponding to a roll rotation of the electronic device 501 through an integration over an angular velocity signal on the x-axis of the electronic device 501 to identify whether the rotation angle is about 180 degrees or about 360 degrees. When the rotation angle is identified to be about 180 degrees or about 360 degrees (e.g., YES at operation 1320), the processor 550 may, at operation 1330, determine that the posture of the electronic device 501 is in a portrait mode.

In an embodiment, when the rotation angle is identified to be not about 180 degrees or about 360 degrees (e.g., NO at operation 1320), the processor 550 may identify the electronic device 501 to have a rotation angle of about 90 degrees or about 270 degrees, and at operation 1340, determine the posture of the electronic device 501 to be in a landscape mode.

Figure 14:
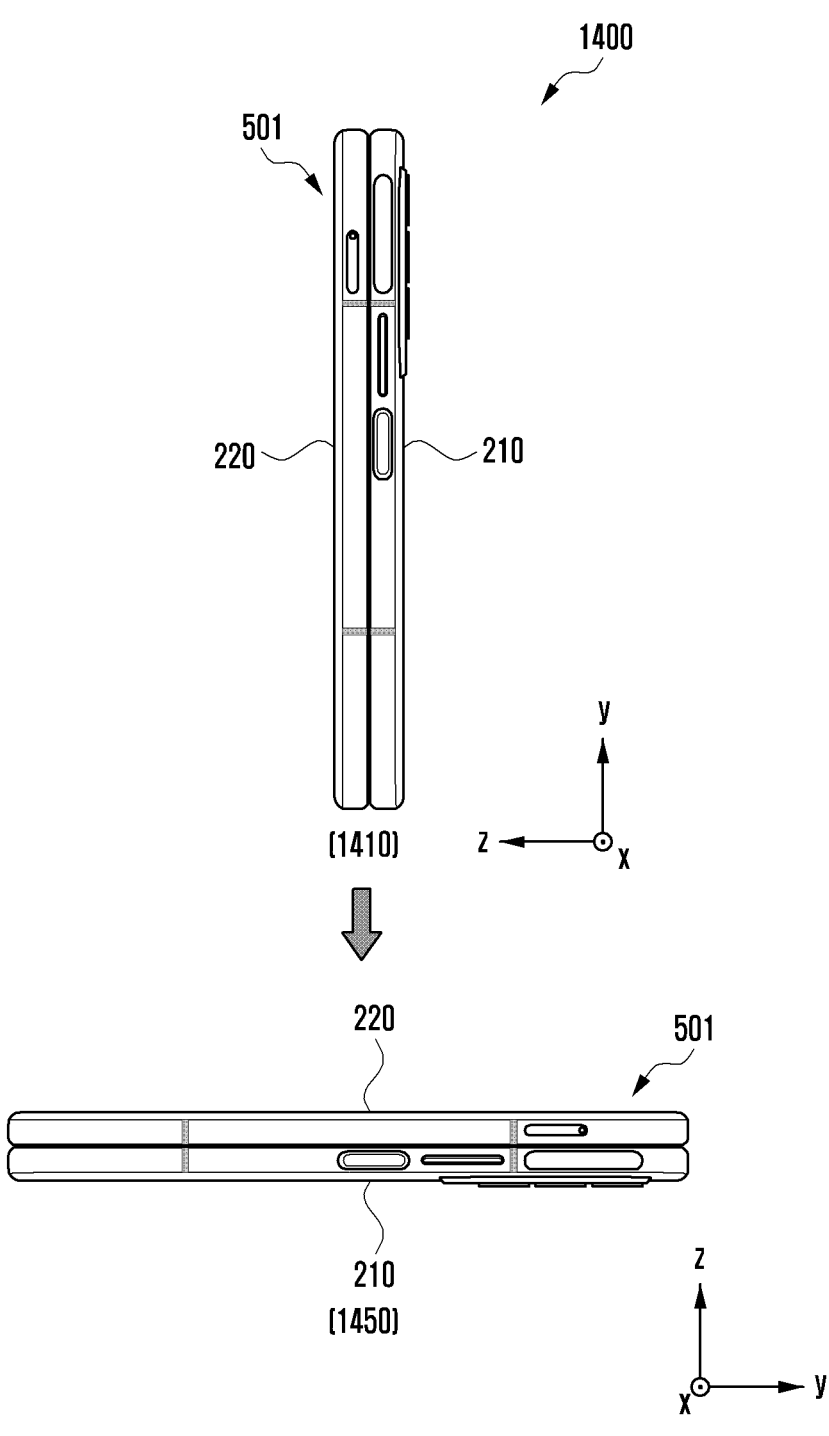
FIG. 14 is a diagram illustrating an example method of determining a posture of an electronic device, according to various embodiments.

FIG. 14 is a diagram illustrating an example method of determining a posture of the electronic device 501, according to various embodiments.

With reference to FIG. 14, as illustrated at reference numeral <1410>, the electronic device (e.g., electronic device 501 in FIG. 5) may be in a state in which the electronic device 501 is in a portrait mode and not resting on the ground. The processor (e.g., processor 550 in FIG. 5) may monitor the rotation state of the electronic device 501 when the electronic device 501 is in a state of reference numeral <1410>. For example, the processor 550 may monitor the rotation state of the electronic device 501 through an integration over an angular velocity signal on a specific axis, e.g., the x-axis, of the electronic device 501.

In an embodiment, the processor 550 may detect the rotation of the electronic device 501 on the basis of a result of the monitoring. For example, the rotation of the electronic device 501 may include a rotation of about 90 degrees, about 180 degrees, about 270 degrees, and about 360 degrees. However, the present disclosure is not limited thereto. In an embodiment, on the basis of the result of the monitoring, when the processor 550 detects that the electronic device 501 has been rotated about 90 degrees, as illustrated in reference numeral <1450>, the processor 550 may identify that the posture of the electronic device 501 has changed to a state of being in a landscape mode and not resting on the ground. When the processor 550 detects that the electronic device 501 transitions to an unfolded state while the posture of the electronic device 501 is in a landscape mode and not resting on the ground, the processor 550 may set a direction of the screen corresponding to a landscape mode and output the screen in a direction corresponding to the set landscape mode through the display (e.g., first display (e.g., first display 541 in FIG. 5)).

According to the embodiments of FIG. 13 and FIG. 14, in accordance with various embodiments, the electronic device 501 may use a gyro integration on a specific axis based on the portrait mode and the state of not resting on the ground of the electronic device 501, e.g., a gyro integration value on the x-axis to accurately determine a direction to output the screen when being switched to an unfolded state in a state of being in a portrait mode and not resting on the ground.

Figure 15:
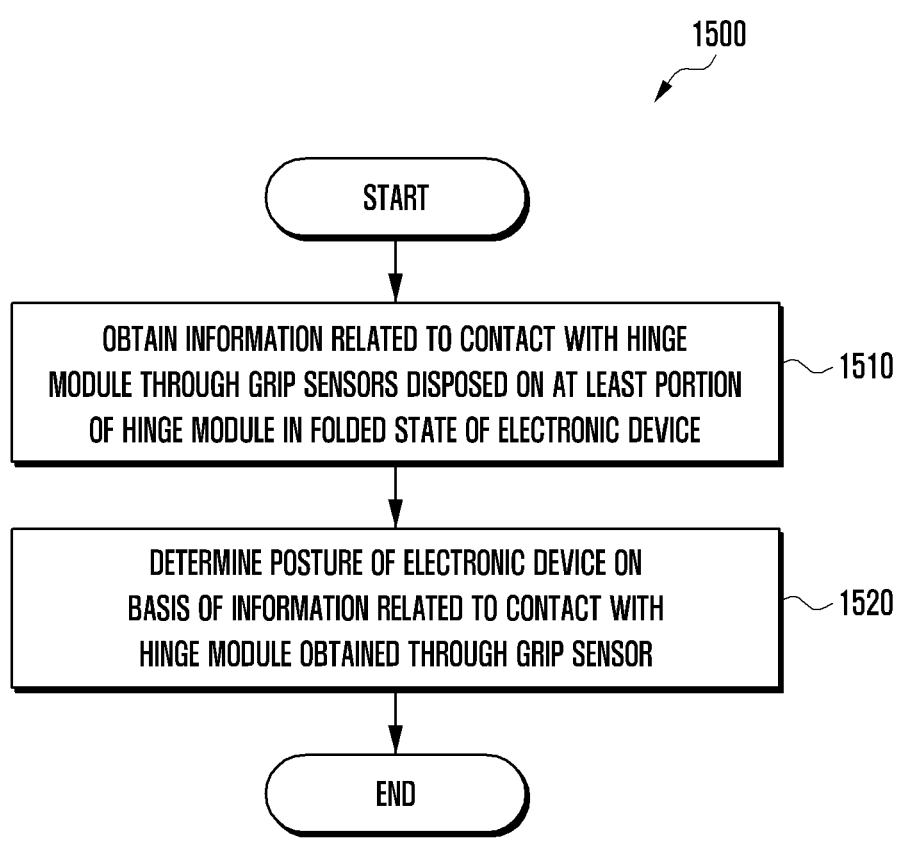
FIG. 15 is a flowchart illustrating an example method of determining a posture of an electronic device, according to various embodiments.

FIG. 15 is a flowchart 1500 illustrating an example method of determining a posture of the electronic device 501, according to various embodiments.

In embodiments below, each operation may be performed sequentially, but is not required to be performed sequentially. For example, the order of each operation may be changed, and at least two operations may be performed in parallel.

According to an embodiment, it may be understood that operations 1510 and 1520 may be performed on the processor (e.g., processor 550 in FIG. 5) of the electronic device (e.g., electronic device 501 in FIG. 5).

FIG. 15 is may correspond to operation 620 in FIG. 6 described above, according to various embodiments.

With reference to FIG. 15, the processor 550 of the electronic device 501 may, at operation 1510, obtain information related to a contact of the hinge module 320 through a grip sensor disposed on at least a portion of the hinge module (e.g., hinge plate 320 in FIG. 4) when the electronic device 501 is in a folded state. For example, the information related to a contact of the hinge module 320 may include a grip position and/or a grip pattern obtained through the grip sensor.

In an embodiment, the processor 550 may, at operation 1520, identify the posture (e.g., landscape mode or portrait mode) of the electronic device 501 on the basis of the information related to a contact of the hinge module 320 obtained through the grip sensor.

With regard to an operation of determining the posture of the electronic device 501 on the basis of the information related to a contact of the hinge module 320 obtained through the grip sensor described above, various embodiments may be described in greater detail below with reference to FIG. 16.

Figure 16:
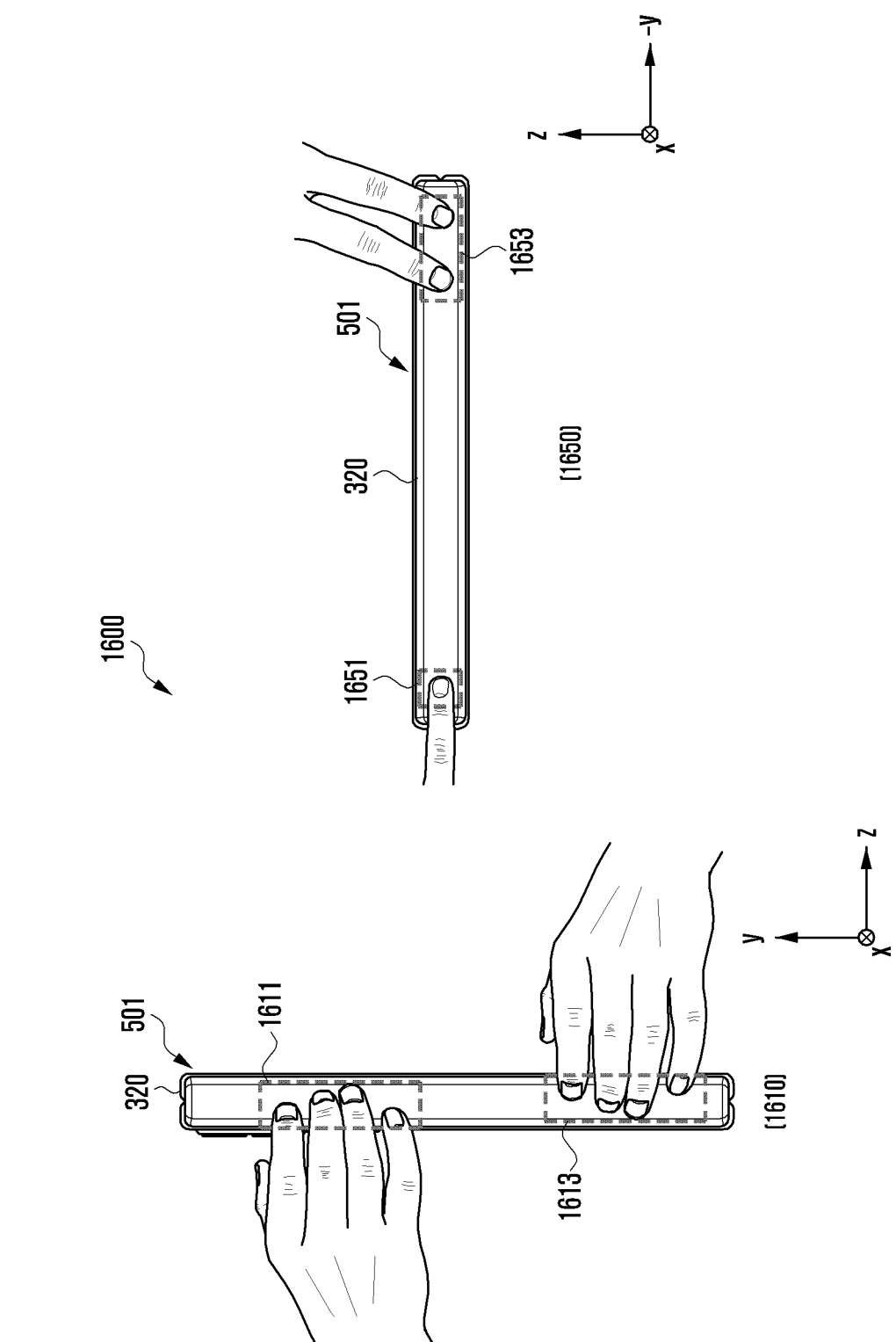
FIG. 16 is a diagram illustrating an example method of determining a posture of an electronic device, according to various embodiments.

FIG. 16 is a diagram 1600 illustrating an example method of determining a posture of the electronic device 501, according to various embodiments.

With reference to FIG. 16, as illustrated at reference numeral <1610>, the electronic device (e.g., electronic device 501 in FIG. 5) may be in a portrait mode and in a state of not resting on the ground. Although not illustrated, the electronic device 501 may be in a portrait mode and in a state of resting on the ground. The electronic device 501 may include a hinge module (e.g., hinge plate 320 in FIG. 4) (e.g., hinge device) for rotatably coupling the first housing (e.g., first housing 210 in FIGS. 2A and 2B) and the second housing (e.g., second housing 220 in FIGS. 2A and 2B) about a folding axis (e.g., folding axis A in FIGS. 2A and 2B).

In an embodiment, a grip sensor may be disposed in at least a partial area of the hinge module 320.

In an embodiment, the processor (e.g., processor 550 in FIG. 5) may obtain information related to a contact of the hinge module 320 when the electronic device 501 is in a folded state through the grip sensor disposed on at least a portion of the hinge module 320. The processor 550 may determine the posture of the electronic device 501 on the basis of the information related to a contact of the hinge module 320 obtained through the grip sensor. In an embodiment, the information related to a contact of the hinge module 320 may include a grip position and/or a grip pattern obtained through the grip sensor.

In an embodiment, as illustrated in reference numeral <1610>, when obtaining the information related to a contact of the hinge module 320 that includes a pattern in which a designated number of fingers (e.g., three) or more are in contact with an upper and lower area 1611 and 1613 of the hinge module 320 when the hinge module 320 is viewed from the front, the processor 550 may determine that the posture of the electronic device 501 is in a portrait mode and in a state of not resting on the ground (or resting on the ground).

In an embodiment, as illustrated in reference numeral <1650>, when obtaining the information related to a contact of the hinge module 320 that includes a pattern in which less than a designated number of fingers (e.g., three) are in contact with left and right areas 1651 and 1653 of the hinge module 320 when the hinge module 320 is viewed from the front, the processor 550 may determine that the posture of the electronic device 501 is in a landscape mode and in a state of not resting on the ground (or resting on the ground).

In FIGS. 15 and 16, according to various embodiments, the processor 550 may, when the electronic device 501 is switched to an unfolded state, set the direction of the screen into a display mode (e.g., a portrait mode or a landscape mode) corresponding to the determined posture of the electronic device 501 (e.g., a state of not resting on the ground (or resting on the ground) in a portrait mode according to reference number <1610>, or a state of not resting on the ground (or resting on the ground) in a landscape mode according to reference number <1650>), and may display the screen in the set display mode (e.g., a portrait mode or a landscape mode) on the first display (e.g., first display 541 in FIG. 5).

In FIGS. 15 and 16, according to various embodiments, the posture of the electronic device 501 may be determined in further consideration of the information related to a contact of the hinge module 320 (e.g., grip position and/or grip pattern) obtained through the grip sensor disposed on at least a portion of the hinge module 320 of the electronic device 501, thereby increasing the accuracy of the operation of determining the posture of the electronic device 501.

Figure 17:
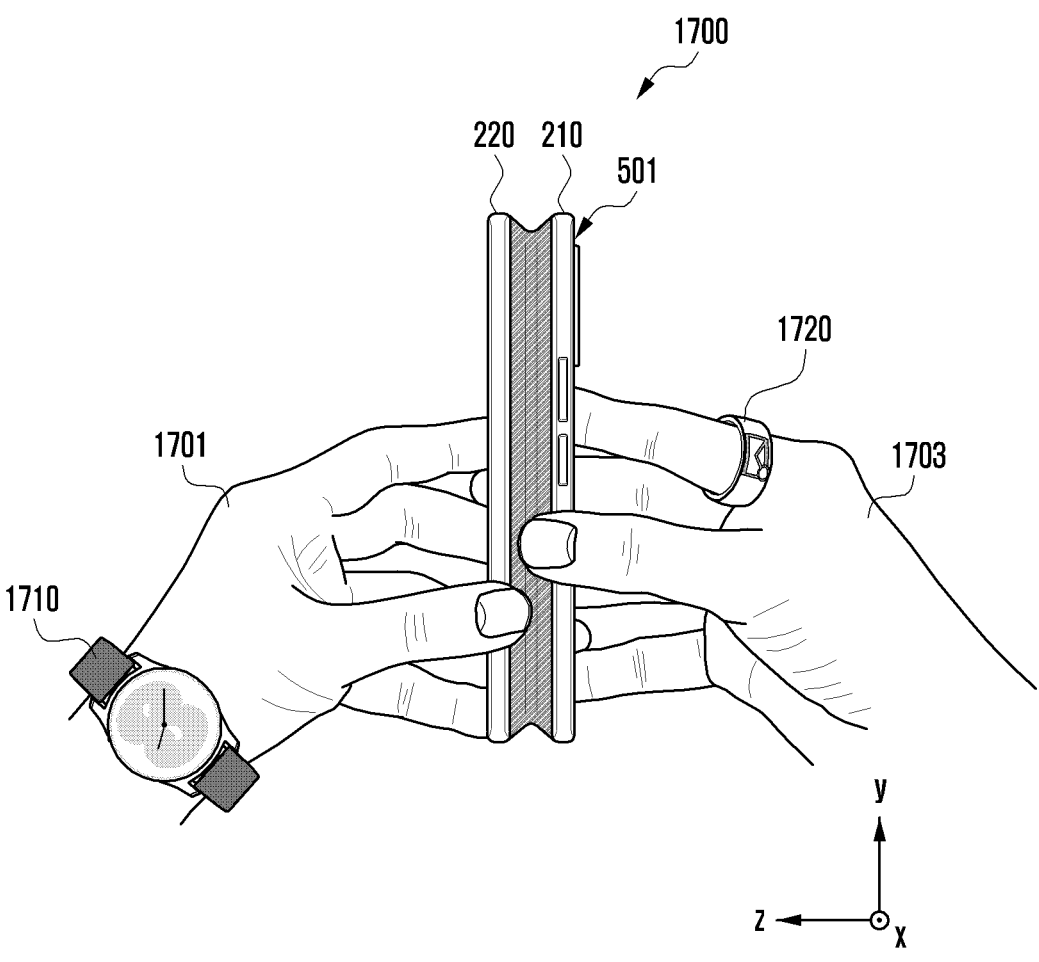
FIG. 17 is a diagram illustrating an example method of determining a posture of an electronic device, according to various embodiments.

FIG. 17 is a diagram 1700 illustrating an example method of determining a posture of the electronic device 501, according to various embodiments.

With reference to FIG. 17, the electronic device (e.g., electronic device 501 in FIG. 5) may be connected in communication with at least two external electronic devices (e.g., wearable electronic devices (e.g., a smart ring, a smart watch)) through the wireless communication circuit (e.g., wireless communication circuit 510 in FIG. 5).

For example, the user may wear a smart watch 1710 on the wrist of a left hand 1701 and a smart ring 1720 on a finger of a right hand 1703. In this case, each of the smart watch 1710 and the smart ring 1720 may be connected in communication with the electronic device 501 through the wireless communication circuit 510.

In an embodiment, each of the smart watch 1710 and the smart ring 1720 may include a sensor circuit (not illustrated), (e.g., an inertial sensor). Each of the smart watch 1710 and the smart ring 1720 may obtain sensor information through the sensor circuit (e.g., an inertial sensor).

In an embodiment, the user may change the posture of the electronic device 501 from being in a portrait mode and a folded state to an unfolded state through an operation of unfolding each of the first housing (e.g., first housing 210 in FIGS. 2A and 2B) and the second housing (e.g., second housing 220 in FIGS. 2A and 2B) in a specific direction (e.g., unfolding the first housing 210 in the x-axis direction and the second housing 220 in the −x-axis direction).

In this case, the smart watch 1710 may obtain sensor information through the sensor circuit (e.g., a sensor circuit provided in the smart watch 1710) by an operation in which the second housing 220 of the electronic device 501 is unfolded in the −x-axis direction, and transmit the obtained sensor information to the electronic device 501. The smart ring 1720 may obtain sensor information through the sensor circuit (e.g., a sensor circuit provided in the smart ring 1720) by an operation in which the first housing 210 of the electronic device 501 is unfolded in the x-axis direction, and transmit the obtained sensor information to the electronic device 501.

In an embodiment, as described above, when the electronic device 501 is switched from a folded state to an unfolded state (or from an unfolded state to a folded state), sensor information on the electronic device 501 (e.g., sensor information measured (or obtained) through the first inertial sensor (e.g., first inertial sensor 533 in FIG. 5) and the second inertial sensor (e.g., second inertial sensor 535 in FIG. 5), respectively) may change, as well as sensor information on the smart watch 1710 and smart ring 1720 worn on the user's left hand 1701 and right hand 1703 may also change.

The disclosure is not limited thereto. When the electronic device 501 does not include an inertial sensor (e.g., first inertial sensor 533 and second inertial sensor 535), a switch in the posture and/or folding state of the electronic device 501 may be determined on the basis of sensor information on at least two wearable electronic devices (e.g., smart watch 1710 and smart ring 1720).

In FIG. 17, according to various embodiments, the posture of the electronic device 501 may be determined on the basis of the sensor information on the electronic device 501 and/or the sensor information on at least two wearable electronic devices (e.g., smart watch 1710 and smart ring 1720) received through the wireless communication circuit 510, thereby increasing the accuracy of the operation of determining the posture of the electronic device 501 and/or the operation of detecting a switch in the folding state of the electronic device 501.

Figure 18A:
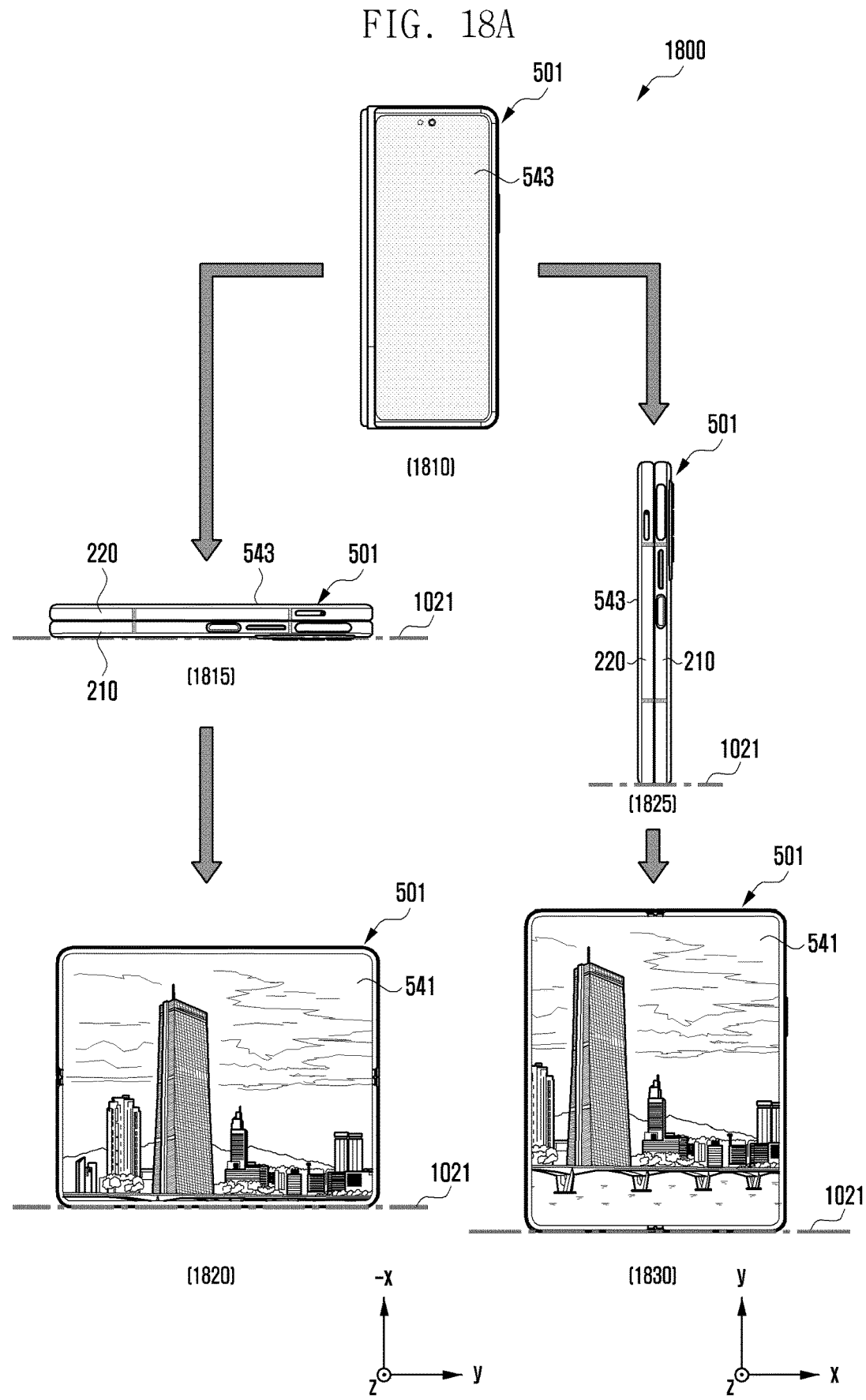
FIG. 18A and FIG. 18B are diagrams illustrating an example method of displaying a screen according to a change in a folding state of an electronic device, according to various embodiments.
Figure 18B:
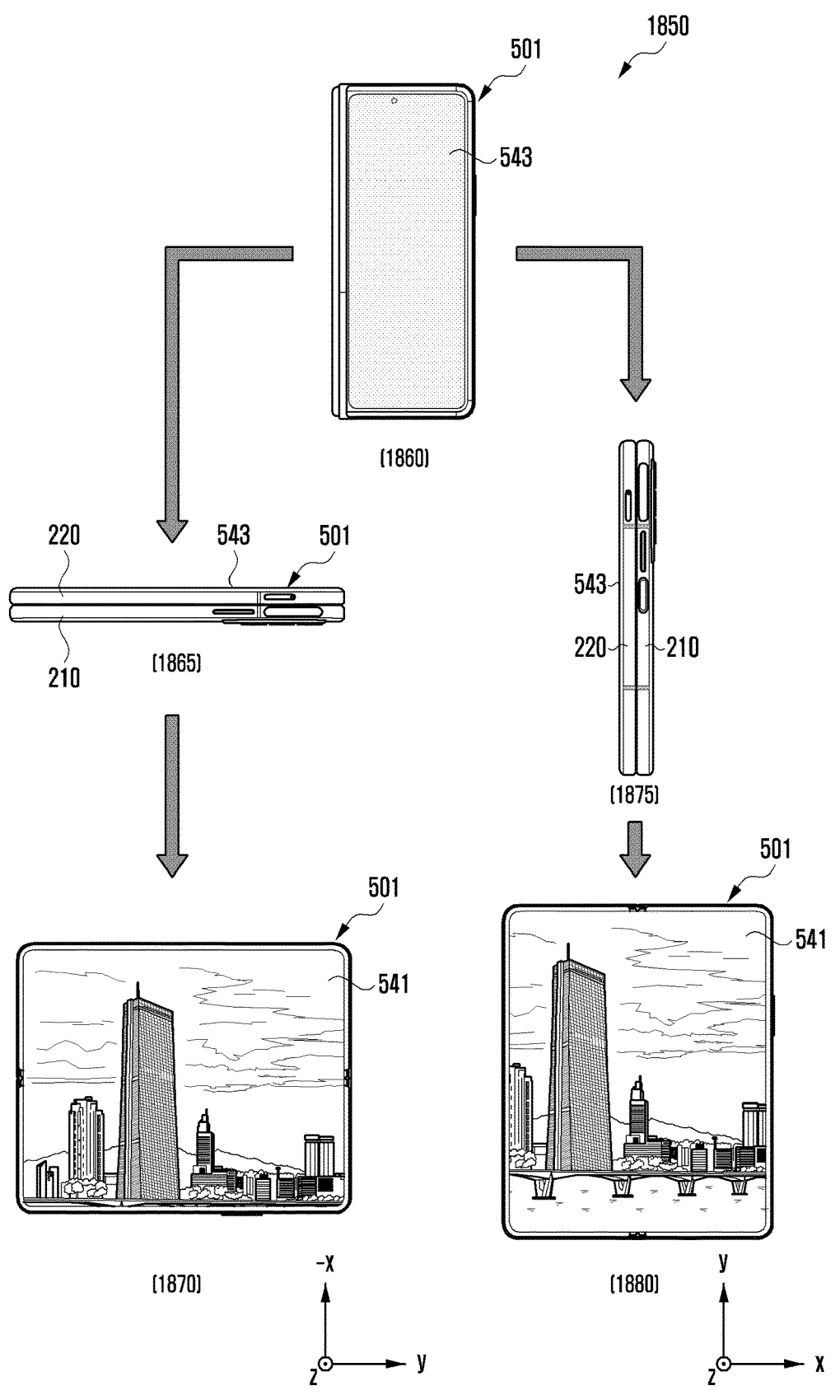

FIG. 18A and FIG. 18B are diagrams 1800 and 1850 illustrating an example method of displaying a screen according to a change in a folding state of the electronic device 501, according to various embodiments.

In various embodiments, the posture of the electronic device (e.g., electronic device 501 in FIG. 5) may include direction information on the electronic device 501 (e.g., a landscape mode or a portrait mode) and a state of resting on the ground (e.g., a floor or a desk) or a state of not resting on the ground. For example, the posture of the electronic device 501 may include a state of resting on the ground in a landscape mode, a state of not resting on the ground in a landscape mode, a state of resting on the ground in a portrait mode, and a state of not resting on the ground in a portrait mode.

With reference to FIG. 18A, as illustrated in reference numeral <1810>, the posture of the electronic device 501 may be in a folded state in a portrait mode. The electronic device 501 may include the display (e.g., display 540 in FIG. 5), e.g., the first display (e.g., first display 541 in FIG. 5), and the second display (e.g., second display 543 in FIG. 5). In an embodiment, the second display 543 may be activated when the electronic device 501 is in a folded state (e.g., the state in FIGS. 3A and 3B) and the first display 541 may be activated when the electronic device 501 is in an unfolded state (e.g., the state in FIGS. 2A and 2B).

In an embodiment, when the posture of the electronic device 501 is in a portrait mode, the second display 543 is activated in a folded state, and the direction of the screen output through the second display 543 may be in a portrait mode. When the posture of the electronic device 501 is in a landscape mode, the second display 543 is activated in a folded state, and the direction of the screen output through the second display 543 may be in a landscape mode.

In an embodiment, as illustrated in reference numeral <1815>, the processor (e.g., processor 550 in FIG. 5) may detect that the electronic device 501 is rotated to a landscape mode and changed into a state of resting on the ground 1021 in a folded state when the posture of the electronic device 501 at reference numeral <1810> is in a portrait mode and in a folded state.

In an embodiment, the processor 550 may detect that the electronic device 501 is switched to an unfolded state, as illustrated in reference numeral <1820>, when the electronic device 501 is in a state of reference numeral <1815>.

In an embodiment, the processor 550 may, when the electronic device 501 is switched to an unfolded state, identify the posture of the electronic device 501 as being in a landscape mode and in a state of resting on the ground 1021, and set the direction of the screen into a landscape mode and display the screen on the first display 541.

In an embodiment, as illustrated in reference numeral <1825>, the processor 550 may detect that the electronic device 501 is rotated about the y-axis (e.g., y-axis in FIG. 3A) (e.g., rotated about −90 degrees) and changed into a state of resting on the ground 1021 in a folded state when the posture of the electronic device 501 in reference numeral <1810> is in a portrait mode.

In an embodiment, the processor 550 may detect that the electronic device 501 is switched to an unfolded state, as illustrated in reference numeral <1830>, when the electronic device 501 is in a state of reference numeral <1825>.

In an embodiment, the processor 550 may, when the electronic device 501 is switched to an unfolded state, identify the posture of the electronic device 501 as being in a portrait mode and in a state of resting on the ground 1021, and set the direction of the screen into a portrait mode and display the screen on the first display 541.

With reference to FIG. 18B, as illustrated in reference numeral <1860>, the posture of the electronic device 501 may be in a folded state in a portrait mode. When the electronic device 501 is in a portrait mode and in a folded state, the second display 543 is activated in a folded state, and the direction of the screen output through the second display 543 may be in a portrait mode.

In an embodiment, the processor 550 may detect that the posture of the electronic device 501 is rotated from a portrait mode in a folded state (e.g., the state in reference numeral <1860>) to a landscape mode, as illustrated in reference numeral <1865>. Accordingly, the electronic device 501 may be in a landscape mode in a folded state. The processor 550 may detect that the electronic device 501 is switched from the state in reference numeral <1865> to an unfolded state, as illustrated in reference numeral <1870>. The processor 550 may, when the electronic device 501 is switched to an unfolded state, identify the posture of the electronic device 501 as being in a landscape mode and in a state of not resting on the ground 1021, and set the direction of the screen into a landscape mode and display the screen on the first display 541.

In an embodiment, the processor 550 may detect a state in which the electronic device 501 is rotated (e.g., rotated about −90 degrees) about the y-axis (e.g., y-axis in FIG. 3A), as illustrated in reference numeral <1875>, when the posture of the electronic device 501 is in a portrait mode and in a folded state (e.g., the state in reference numeral <1860>). The processor 550 may detect that the electronic device 501 is switched to an unfolded state, as illustrated in reference numeral <1880>, when the electronic device 501 is in a state of reference numeral <1875>. The processor 550 may, when the electronic device 501 is switched to an unfolded state, identify the posture of the electronic device 501 as being in a portrait mode and in a state of not resting on the ground 1021, and set the direction of the screen into a portrait mode and display the screen on the first display 541.

In a method of displaying a screen according to a change in a folding state of the electronic device, according to an example embodiment of the disclosure, the electronic device may include the hinge module including a hinge; a first housing connected to the hinge module and including a first surface, a second surface facing in a direction opposite to the first surface, and a first side surface surrounding a first space between the first surface and the second surface; a second housing connected to the hinge module and configured to be foldable with respect to the first housing, and including, in an unfolded state, a third surface facing in the same direction as the first surface, a fourth surface facing in a direction opposite to the third surface, and a second side surface surrounding a second space between the third surface and the fourth surface; a first display disposed from at least a portion of the first surface of the first housing to at least a portion of the third surface of the second housing; the second display disposed on at least a portion of the fourth surface 22 of the second housing; a first inertial sensor disposed in the first housing 210; a second inertial sensor 535 disposed in the second housing. The method of displaying a screen according to a change in a folding state of the electronic device may include: based on a switch of the electronic device from a folded state to an unfolded state being detected, determining a posture of the electronic device based on first sensing information on the first inertial sensor, second sensing information on the second inertial sensor, and time information that an angle between the first housing and the second housing is changed to a designated angle; setting a direction of the screen into a display mode corresponding to the determined posture of the electronic device; and displaying the screen on the first display 230 or 541.

In an example embodiment, the method of displaying a screen according to a change in a folding state of the electronic device may include: detecting a switch of the electronic device from a folded state to an unfolded state based on whether a sensor value obtained through the magnetic sensor has a designated sensor value and whether a value of the angle between the first housing and the second housing exceeds a designated angle.

In an example embodiment, the determining of the posture of the electronic device may include: identifying whether the first sensing information on the first inertial sensor and the second sensing information on the second inertial sensor have a designated value; based on the first sensing information on the first inertial sensor and the second sensing information on the second inertial sensor having a designated value, identifying whether the time during which the angle between the first housing is changed to a designated angle is equal to or less than a designated time; based on the time during which the angle between the first housing and the second housing being changed to a designated angle equal to or less than a designated time, determining the posture of the electronic device to be in a state of not resting on the ground in a portrait mode.

In an example embodiment, the determining of the posture of the electronic device may include: based on the time during which the angle between the first housing and the second housing being changed to a designated angle not equal to or less than a designated time, determining the posture of the electronic device to be in a state of resting on the ground in a portrait mode.

In an example embodiment, the determining of the posture of the electronic device may include: identifying whether the first sensing information on the first inertial sensor and the second sensing information on the second inertial sensor have a designated value; based on the first sensing information on the first inertial sensor and the second sensing information on the second inertial sensor not having a designated value, identifying whether the time during which the angle between the first housing and the second housing is changed to a designated angle equal to or less than a designated time; based on the time during which the angle between the first housing and the second housing being changed to a designated angle is equal to or less than a designated time, determining the posture of the electronic device to be in a state of not resting on the ground in a landscape mode.

In an example embodiment, the determining of the posture of the electronic device may include: based on the time during which the angle between the first housing and the second housing being changed to a designated angle exceeds a designated time, determining the posture of the electronic device to be in a state of resting on the ground in a landscape mode.

In an example embodiment, the determining of the posture of the electronic device may include: identifying whether the value of the angle between the first housing and the second housing exceeds a designated angle; based on the value of the angle between the first housing and the second housing exceeding a designated angle, identifying whether the differential value of the first sensing information on the first inertial sensor and the second sensing information on the second inertial sensor measured on a specific axis is less than a designated value; determining that the posture of the electronic device is in a portrait mode based on the differential value of the first sensing information on the first inertial sensor and the second sensing information on the second inertial sensor measured on a specific axis being less than a designated value; determining the posture of the electronic device to be in a landscape mode based on the differential value of the first sensing information on the first inertial sensor and the second sensing information on the second inertial sensor measured on a specific axis being equal to or greater than a designated value.

In an example embodiment, the determining of the posture of the electronic device may include: obtaining information related to a contact of the hinge module through a grip sensor disposed on at least a portion of the hinge module; and determining the posture of the electronic device based on the information obtained related to a contact of the hinge module.

In an example embodiment, the information related to a contact of the hinge module may include at least one of a grip position and a grip pattern obtained through the grip sensor disposed on at least a portion of the hinge module.

In an example embodiment, the setting of the direction of the screen into a display mode corresponding to the posture of the electronic device and displaying the screen on the first display may include: based on the posture of the electronic device being determined to be in a portrait mode, setting the direction of the screen into a portrait mode and displaying the screen in the set portrait mode on the first display; and based on the posture of the electronic device being determined to be in a landscape mode, setting the direction of the screen into a landscape mode and displaying the screen in the set landscape mode on the first display.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., through wires), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments disclosed in this disclosure and drawings are merely specific examples presented to facilitate explanation of the technical content of the disclosure and understanding of the disclosure, and are not intended to limit the scope of the disclosure. Therefore, the scope of the disclosure should be understood to include, in addition to the various example embodiments disclosed herein, all modifications or modified forms derived based on the technical idea of the disclosure. It will also be understood that any of the embodiment(s) described herein may be used in conjunction with any other embodiment(s) described herein.

What is claimed is:

1. An electronic device comprising:
a hinge module comprising a hinge;
a first housing connected to the hinge module and including a first surface, a second surface facing in a direction opposite to the first surface, and a first side surface surrounding a first space between the first surface and the second surface;
a second housing connected to the hinge module and configured to be foldable with respect to the first housing and including, in an unfolded state, a third surface facing in the same direction as the first surface, a fourth surface facing in a direction opposite to the third surface, and a second side surface surrounding a second space between the third surface and the fourth surface;
a first display disposed as visible via at least a portion of the third surface from at least a portion of the first surface;
a second display disposed as visible via at least a portion of the fourth surface;

a first inertial sensor disposed in the first housing;
a second inertial sensor disposed in the second housing;
a memory; and
at least one processor, comprising processing circuitry, operatively connected to the first display, the second display, the first inertial sensor, the second inertial sensor, and the memory,
wherein at least one processor, individually and/or collectively, is configured to:
determine, based on detecting the electronic device being switched from a folded state to the unfolded state, a posture of the electronic device based on first sensing information of the first inertial sensor, second sensing information of the second inertial sensor, and time information during which an angle between the first housing and the second housing is changed to a designated angle, and
set a direction of a screen into a display mode corresponding to the determined posture of the electronic device to display the screen on the first display.

2. The electronic device of claim 1, wherein at least one processor, individually and/or collectively, is configured to: detect the electronic device being switched from the folded state to the unfolded state based on whether a sensor value obtained through a magnetic sensor has a designated sensor value and whether an angle value between the first housing and the second housing exceeds a designated angle.

3. The electronic device of claim 1, wherein at least one processor, individually and/or collectively, is configured to:
identify whether the first sensing information on the first inertial sensor and the second sensing information on the second inertial sensor have a designated value;
identify, based on the first sensing information on the first inertial sensor and the second sensing information on the second inertial sensor having the designated value, whether a time at which an angle between the first housing and the second housing is changed to the designated angle equal to or less than a designated time; and
determine, based on the time at which the angle between the first housing and the second housing being changed to the designated angle is equal to or less than the designated time, the posture of the electronic device to be in a state of not resting on a ground in a portrait mode.

4. The electronic device of claim 3, wherein at least one processor, individually and/or collectively, is configured to:
determine, based on the time at which the angle between the first housing and the second housing being changed to the designated angle is not equal to or less than the designated time, the posture of the electronic device to be in a state of resting on the ground in the portrait mode.

5. The electronic device of claim 1, wherein at least one processor, individually and/or collectively, is configured to:
identify whether the first sensing information on the first inertial sensor and the second sensing information on the second inertial sensor have a designated value;
identify, based on the first sensing information on the first inertial sensor and the second sensing information on the second inertial sensor not having the designated value, whether a time at which an angle between the first housing and the second housing is changed to the designated angle equal to or less than a designated time; and
determine, based on the time at which the angle between the first housing and the second housing being changed to the designated angle equal to or less than the designated time, the posture of the electronic device to be in a state of not resting on a ground in a landscape mode.

6. The electronic device of claim 5, wherein at least one processor, individually and/or collectively, is configured to:
   determine, based on the time at which the angle between the first housing and the second housing being changed to the designated angle exceeding the designated time, the posture of the electronic device to be in a state of resting on the ground in the landscape mode.

7. The electronic device of claim 1, wherein at least one processor, individually and/or collectively, is configured to:
   identify whether an angle value between the first housing and the second housing exceeds a designated angle;
   identify, based on the angle value between the first housing and the second housing exceeding the designated angle, whether a differential value of the first sensing information on the first inertial sensor and the second sensing information on the second inertial sensor measured at a specific axis is less than a designated value;
   determine, based on the differential value of the first sensing information on the first inertial sensor and the second sensing information on the second inertial sensor measured at the specific axis being less than the designated value, the posture of the electronic device to be in a portrait mode; and
   determine, based on the differential value of the first sensing information on the first inertial sensor and the second sensing information on the second inertial sensor measured on the specific axis being equal to or greater than the designated value, the posture of the electronic device to be in a landscape mode.

8. The electronic device of claim 1, further comprising:
   a grip sensor disposed on at least a portion of the hinge module,
   wherein at least one processor, individually and/or collectively, is configured to:
   obtain, through the grip sensor, information related to a contact of the hinge module, and
   determine the posture of the electronic device based on the obtained information related to the contact of the hinge module.

9. The electronic device of claim 8, wherein at least one processor, individually and/or collectively, is configured to:
   wherein the information related to the contact of the hinge module includes at least one of a grip position and a grip pattern obtained through the grip sensor.

10. The electronic device of claim 3, wherein at least one processor, individually and/or collectively, is configured to:
   set, based on the posture of the electronic device being determined to be in the portrait mode, a direction of the screen to the portrait mode, and display the screen in the set portrait mode on the first display; and
   set, based on the posture of the electronic device being determined to be in the landscape mode, a direction of the screen to the landscape mode, and display the screen in the set landscape mode on the first display.

11. A method of displaying a screen according to a folding state of an electronic device being changed, the electronic device comprising:
   a hinge module comprising a hinge;
   a first housing connected to the hinge module and including a first surface, a second surface facing in a direction opposite to the first surface, and a first side surface surrounding a first space between the first surface and the second surface;
   a second housing connected to the hinge module and configured to be foldable with respect to the first housing and including, in an unfolded state, a third surface facing in the same direction as the first surface, a fourth surface facing in a direction opposite to the third surface, and a second side surface surrounding a second space between the third surface and the fourth surface;
   a first display disposed as visible via at least a portion of the third surface from at least a portion of the first surface;
   a second display disposed as visible via at least a portion of the fourth surface a first inertial sensor disposed in the first housing; and
   a second inertial sensor disposed in the second housing, the method comprising:
   determining, based on detecting the electronic device being switched from a folded state to the unfolded state, a posture of the electronic device based on first sensing information on the first inertial sensor, second sensing information on the second inertial sensor, and time information during which an angle between the first housing and the second housing is changed to a designated angle; and
   setting a direction of a screen into a display mode corresponding to the determined posture of the electronic device to display the screen on the first display.

12. The method of claim 11, further comprising:
   detecting the electronic device being switched from the folded state to the unfolded state based on whether a sensor value obtained through a magnetic sensor has a designated sensor value and whether an angle value between the first housing and the second housing exceeds a designated angle.

13. The method of claim 11, wherein the determining of the posture of the electronic device further includes:
   identifying whether the first sensing information on the first inertial sensor and the second sensing information on the second inertial sensor have a designated value;
   identifying, based on the first sensing information on the first inertial sensor and the second sensing information on the second inertial sensor having the designated value, whether a time at which an angle between the first housing and the second housing is changed to the designated angle equal to or less than a designated time; and
   determining, based on the time at which the angle between the first housing and the second housing being changed to the designated angle equal to or less than the designated time, the posture of the electronic device to be in a state of not resting on a ground in a portrait mode.

14. The method of claim 13, further comprising:
   determining, based on the time at which the angle between the first housing and the second housing being changed to the designated angle not equal to or less than the designated time, the posture of the electronic device to be in a state of resting on the ground in the portrait mode.

15. The method of claim 11, wherein the determining of the posture of the electronic device further includes:
   identifying whether the first sensing information on the first inertial sensor and the second sensing information on the second inertial sensor have a designated value;

identifying, based on the first sensing information on the first inertial sensor and the second sensing information on the second inertial sensor not having the designated value, whether a time at which an angle between the first housing and the second housing is changed to the designated angle equal to or less than a designated time; and determining, based on the time at which the angle between the first housing and the second housing being changed to the designated angle equal to or less than the designated time, the posture of the electronic device to be in a state of not resting on a ground in a landscape mode.

16. The method of claim 15, further comprising:

determining, based on the time at which the angle between the first housing and the second housing being changed to the designated angle exceeding the designated time, the posture of the electronic device to be in a state of resting on the ground in the landscape mode.

17. The method of claim 11, wherein the determining of the posture of the electronic device further includes:

identifying whether an angle value between the first housing and the second housing exceeds a designated angle;

identifying, based on the angle value between the first housing and the second housing exceeding the designated angle, whether a differential value of the first sensing information on the first inertial sensor and the second sensing information on the second inertial sensor measured at a specific axis is less than a designated value;

determining, based on the differential value of the first sensing information on the first inertial sensor and the second sensing information on the second inertial sensor measured at the specific axis being less than the designated value, the posture of the electronic device to be in a portrait mode; and determining, based on the differential value of the first sensing information on the first inertial sensor and the second sensing information on the second inertial sensor measured on the specific axis being equal to or greater than the designated value, the posture of the electronic device to be in a landscape mode.

18. The method of claim 11, wherein the determining of the posture of the electronic device further includes:

obtaining information related to a contact of the hinge module through a grip sensor disposed on at least a portion of the hinge module; and determining the posture of the electronic device based on the obtained information related to a contact of the hinge module.

19. The method of claim 18, wherein the information related to a contact of the hinge module includes at least one of a grip position and a grip pattern obtained through the grip sensor.

20. The method of claim 13, wherein the displaying of the screen on the first display includes:

setting, based on the posture of the electronic device being determined to be in the portrait mode, a direction of the screen to the portrait mode, and displaying the screen in the set portrait mode on the first display; and setting, based on the posture of the electronic device being determined to be in the landscape mode, a direction of the screen to the landscape mode, and displaying the screen in the set landscape mode on the first display.

* * * * *